United States Patent
McNutt et al.

(10) Patent No.: US 8,544,892 B2
(45) Date of Patent: Oct. 1, 2013

(54) PORT IDENTIFICATION SYSTEM AND METHOD

(75) Inventors: Patrick S. McNutt, Carnation, WA (US); Phillip Phung, Kirkland, WA (US); James Lee Martin, Bonney Lake, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 259 days.

(21) Appl. No.: 12/512,830

(22) Filed: Jul. 30, 2009

(65) Prior Publication Data

US 2009/0300959 A1    Dec. 10, 2009

Related U.S. Application Data

(63) Continuation of application No. 11/381,940, filed on May 5, 2006, now Pat. No. 7,740,282.

(51) Int. Cl.
 *G09F 7/00* (2006.01)
 *B42D 15/00* (2006.01)
 *B42D 15/10* (2006.01)

(52) U.S. Cl.
 USPC .... 283/74; 40/611.02; 40/611.03; 40/611.06; 40/611.07; 40/611.1; 283/70; 283/72; 283/81; 283/107

(58) Field of Classification Search
 USPC ............... 40/299.01, 611.02, 611.03, 611.06, 40/611.07, 611.09, 611.1, 611.11, 611.12, 40/611.13, 626, 642.02, 647, 649, 651, 652, 40/653, 654, 655, 657, 658, 661, 781; 281/51; 283/70, 72, 74, 81, 107, 117
 See application file for complete search history.

(56) References Cited

U.S. PATENT DOCUMENTS

| | | | |
|---|---|---|---|
| 2,041,097 A | | 5/1936 | Vierling |
| 2,388,431 A | * | 11/1945 | Neiman .......................... 40/781 |
| 2,431,999 A | | 12/1947 | Engelhardt |
| 2,549,419 A | | 4/1951 | Callahan |
| 3,409,347 A | * | 11/1968 | Vogel ............................. 40/654 |
| 3,989,338 A | | 11/1976 | Gosser |
| 4,780,573 A | | 10/1988 | Own |
| 4,820,193 A | | 4/1989 | Noorily |

(Continued)

FOREIGN PATENT DOCUMENTS

| | | |
|---|---|---|
| JP | 05033412 | 4/1993 |
| JP | 10172362 | 6/1998 |

(Continued)

OTHER PUBLICATIONS

International Search Report dated Feb. 28, 2011, for International Patent Application No. PCT/US2010/038806 filed Jun. 16, 2010.

(Continued)

*Primary Examiner* — Dana Ross
*Assistant Examiner* — Justin V Lewis
(74) *Attorney, Agent, or Firm* — Davis Wright Tremaine LLP; George C. Rondeau, Jr.; Heather M. Colburn

(57) ABSTRACT

A cable port identification system is disclosed that provides identification facilities for communication, data, other cabling and/or wires and the connectors to which they are coupled found in a multi-port station. In some implementations the identification facilities can include label retention and protection and may also include label magnification.

35 Claims, 39 Drawing Sheets

(56) References Cited

U.S. PATENT DOCUMENTS

| | | |
|---|---|---|
| 5,051,870 A | 9/1991 | Companion |
| 5,284,363 A | 2/1994 | Gartner et al. |
| 5,380,045 A | 1/1995 | Comann |
| D359,475 S | 6/1995 | Coffey |
| D366,025 S | 1/1996 | Siernon et al. |
| 5,538,438 A | 7/1996 | Orlando |
| 5,611,691 A | 3/1997 | Poulain |
| 5,613,874 A * | 3/1997 | Orlando et al. ............ 40/611.06 |
| 5,675,125 A | 10/1997 | Hollinger |
| 5,765,698 A | 6/1998 | Bullivant |
| D411,514 S | 6/1999 | Tulley |
| D411,515 S | 6/1999 | Tulley |
| 5,983,539 A * | 11/1999 | Martin et al. .................. 40/655 |
| 6,017,229 A | 1/2000 | Tulley et al. |
| 6,053,764 A | 4/2000 | Curry et al. |
| 6,135,505 A | 10/2000 | Fendt et al. |
| 6,215,067 B1 | 4/2001 | Chen |
| 6,282,826 B1 | 9/2001 | Richards |
| 6,305,950 B1 | 10/2001 | Doorhy |
| 6,337,836 B1 | 1/2002 | Eidelson |
| 6,347,715 B1 | 2/2002 | Drozdenko et al. |
| 6,371,793 B1 | 4/2002 | Doorhy et al. |
| 6,416,339 B1 | 7/2002 | Snow et al. |
| 6,461,189 B1 | 10/2002 | Koh |
| 6,478,611 B1 | 11/2002 | Hyland |
| 6,496,884 B1 | 12/2002 | Friesen |
| 6,520,544 B1 | 2/2003 | Mitchell et al. |
| 6,722,563 B1 | 4/2004 | Johnson et al. |
| 6,752,431 B1 | 6/2004 | Matthews et al. |
| 6,761,583 B2 | 7/2004 | Ortowski et al. |
| 6,786,776 B2 | 9/2004 | Itano et al. |
| 6,814,624 B2 | 11/2004 | Clark et al. |
| 6,831,569 B2 | 12/2004 | Wang |
| 6,974,352 B2 | 12/2005 | Clark et al. |
| 7,119,708 B2 | 10/2006 | Newell |
| 7,161,556 B2 | 1/2007 | Morgan et al. |
| 7,211,163 B2 | 5/2007 | Kennedy |
| 7,270,565 B2 | 9/2007 | Kamata et al. |
| D554,598 S | 11/2007 | Laursen et al. |
| 7,306,492 B2 | 12/2007 | Clark et al. |
| 7,357,249 B1 | 4/2008 | Weber |
| 7,424,785 B2 | 9/2008 | Feroli et al. |
| 7,547,227 B1 | 6/2009 | Gibson et al. |
| 7,581,843 B2 | 9/2009 | Stauner |
| 7,585,191 B2 | 9/2009 | Hawley et al. |
| D616,374 S | 5/2010 | McNutt et al. |
| 7,756,380 B2 | 7/2010 | Ruiz et al. |
| 2002/0194725 A1 | 12/2002 | Perea, Jr. et al. |
| 2003/0124908 A1 | 7/2003 | Chen |
| 2004/0026918 A1 | 2/2004 | Piana |
| 2004/0154196 A1 | 8/2004 | Miyake |
| 2004/0163837 A1 | 8/2004 | Price |
| 2005/0057353 A1 | 3/2005 | Barrieau et al. |
| 2006/0059757 A1 | 3/2006 | Didulo |
| 2006/0084323 A1 | 4/2006 | Clark et al. |
| 2006/0150458 A1 * | 7/2006 | Feroli et al. ..................... 40/661 |
| 2007/0121323 A1 | 5/2007 | Pawlik et al. |
| 2007/0227053 A1 | 10/2007 | Miyake |
| 2007/0238352 A1 | 10/2007 | Deng |
| 2008/0090461 A1 | 4/2008 | Pepe et al. |
| 2009/0053923 A1 | 2/2009 | Navarro et al. |
| 2009/0194226 A1 | 8/2009 | Tabet |
| 2010/0095572 A1 | 4/2010 | Laursen et al. |

FOREIGN PATENT DOCUMENTS

| | | |
|---|---|---|
| JP | 2007174750 | 7/2007 |
| KR | 200283068 | 7/2002 |
| KR | 200422110 | 7/2006 |
| WO | PCT/US2009/061104 | 5/2010 |

OTHER PUBLICATIONS

Written Opinion dated Feb. 28, 2011, for International Patent Application No. PCT/US2010/038806 filed Jun. 16, 2010.

* cited by examiner

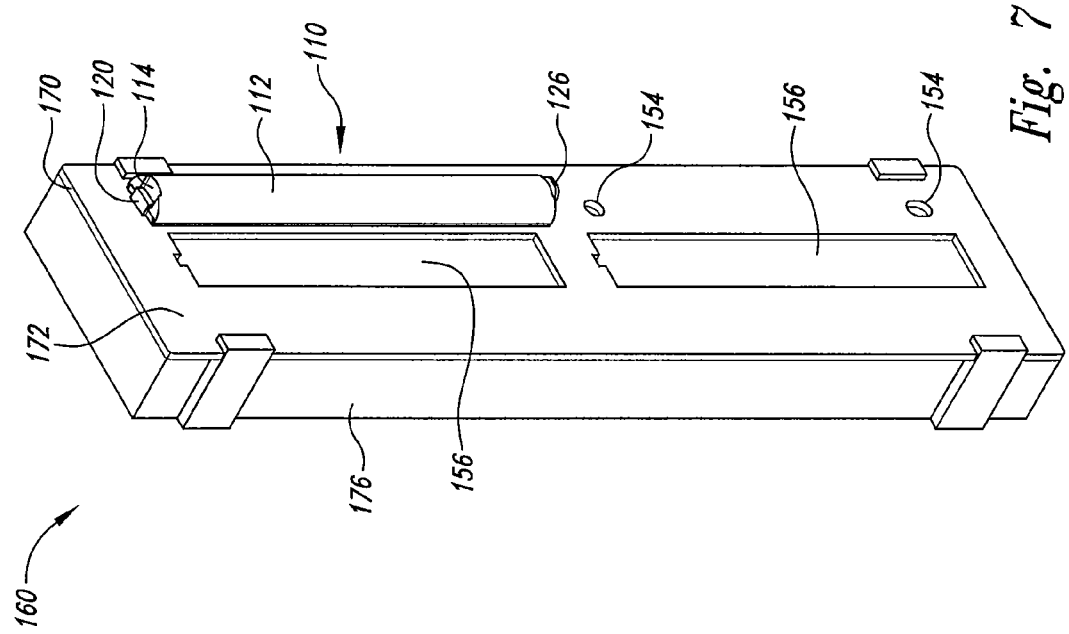
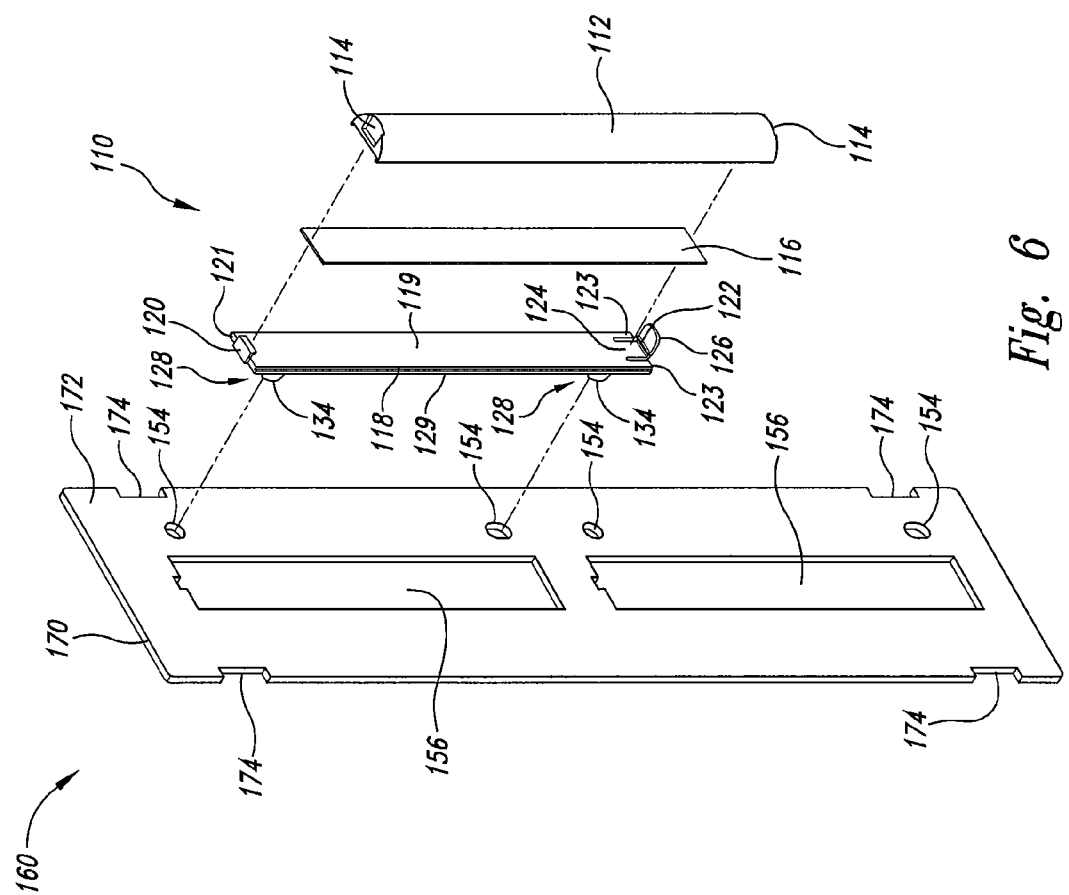

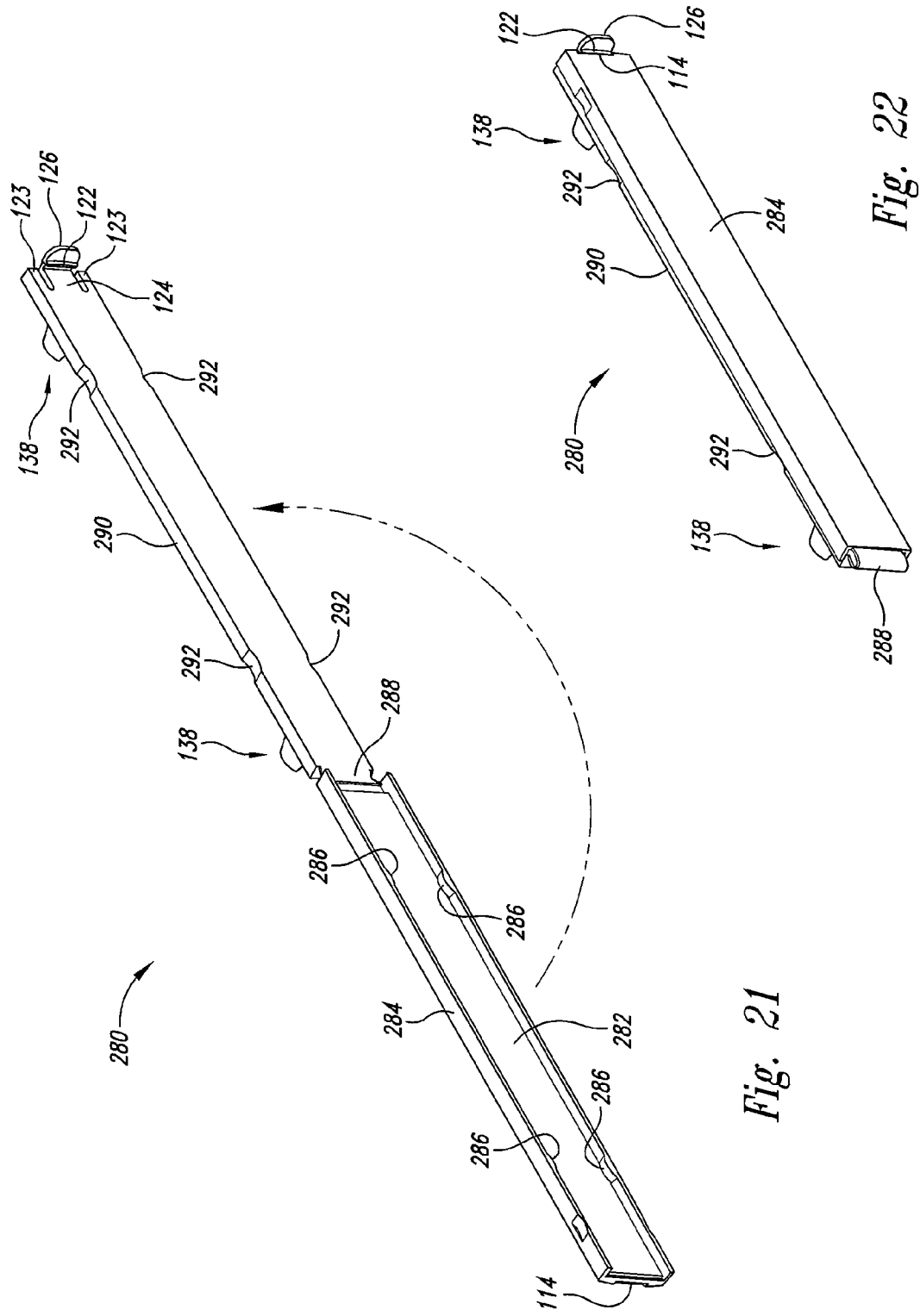

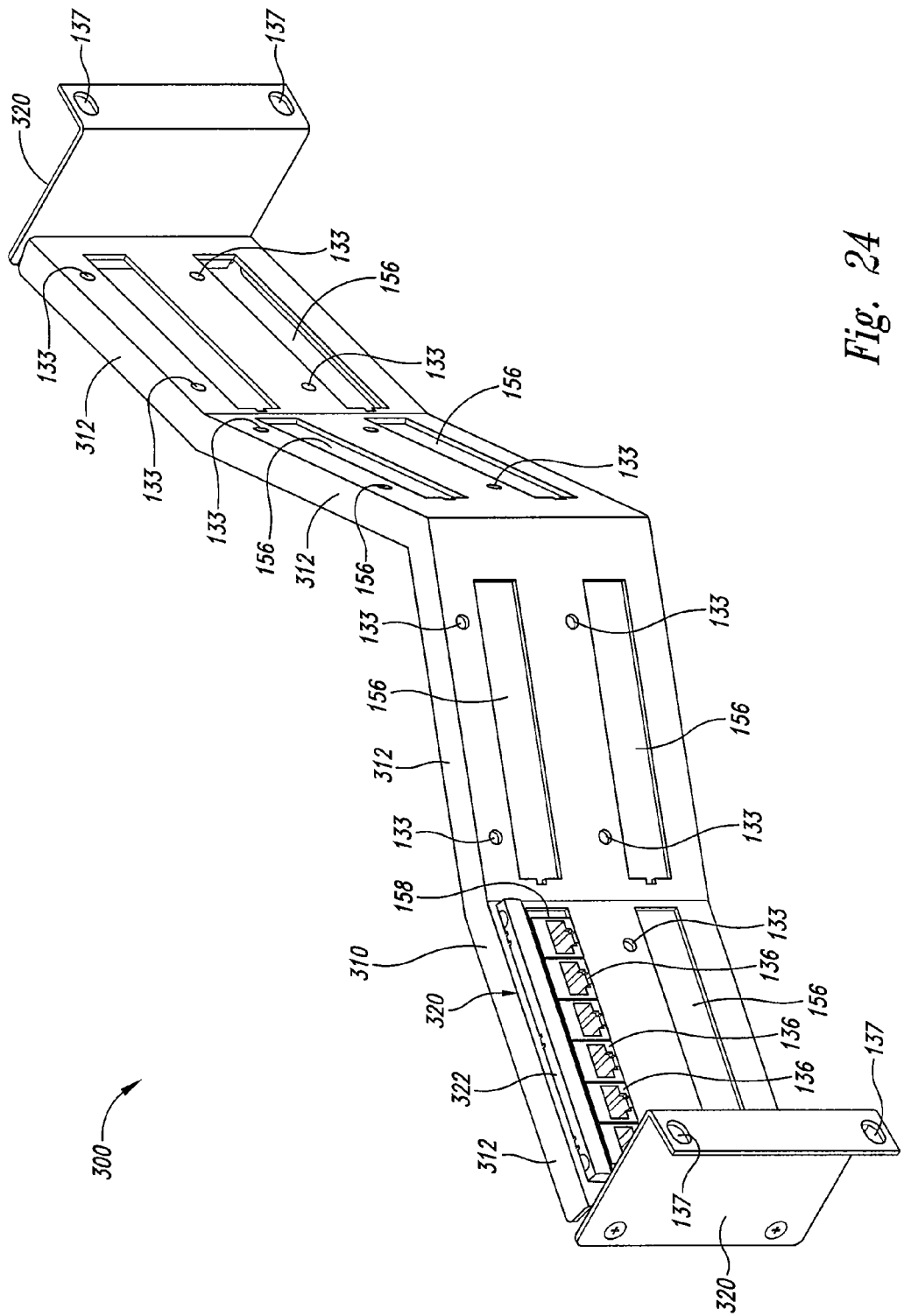

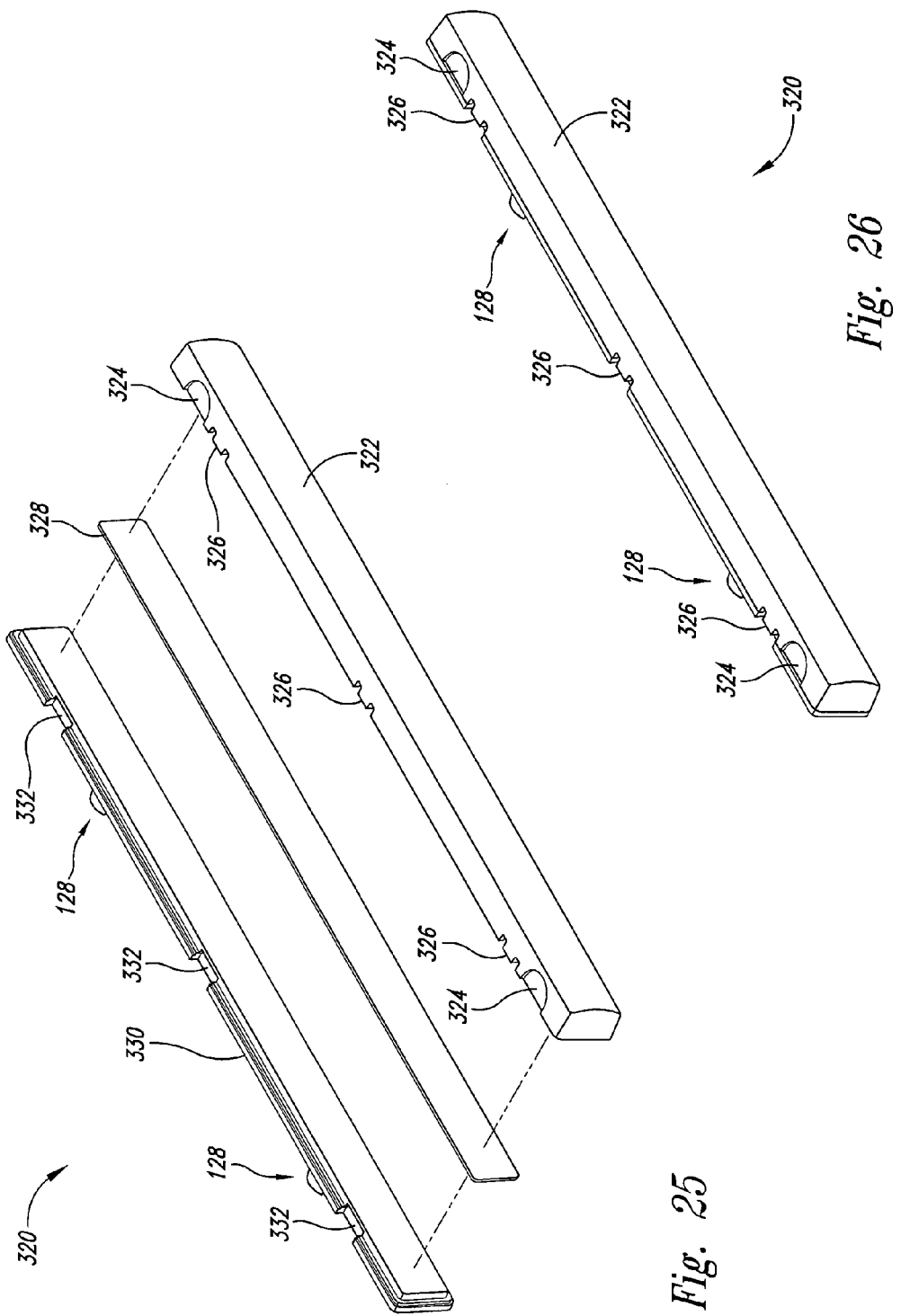

PORT IDENTIFICATION SYSTEM AND METHOD

BACKGROUND OF THE INVENTION

1. Field of the Invention

The present invention is generally related to multi-port stations for communication connectors.

2. Description of the Related Art

Connectors are used to couple communication and/or data cabling and/or wires with other communication, data or other cabling and/or wires. Conventional multi-port stations, such as patch panels, wall plates, etc. retain one or more of the connectors and can be mounted on walls, in communication and/or racks, etc. As installed, the connectors and cabling can raise management challenges associated with keeping track of which cable is connected to which equipment or keeping track of which cable is part of a particular circuit.

BRIEF DESCRIPTION OF THE SEVERAL VIEWS OF THE DRAWING(S)

FIG. 6 is an exploded isometric front view of a third combination of the first label implementation of FIG. 1 and a third multi-port station.

FIG. 7 is an isometric front view of the third combination of FIG. 6.

FIG. 21 is an isometric front view of the fourth label implementation of FIG. 20 in an open position.

FIG. 22 is an isometric front view of the fourth label implementation of FIG. 20 in a closed position.

FIG. 24 is an isometric front view of a ninth combination of a fifth label implementation and a sixth multi-port station.

FIG. 25 is an exploded isometric front view of the fifth label implementation of FIG. 24.

FIG. 26 is an isometric front view of the fifth label implementation of FIG. 24 in a closed position.

DETAILED DESCRIPTION OF THE INVENTION

A cable port identification system is disclosed that provides identification facilities for communication, data, other cabling and/or wires and the connectors to which they are coupled found in a multi-port station. In some implementations the identification facilities includes label retention and protection, and may also include label magnification such as including a cover formed as a lens.

Figure 1:
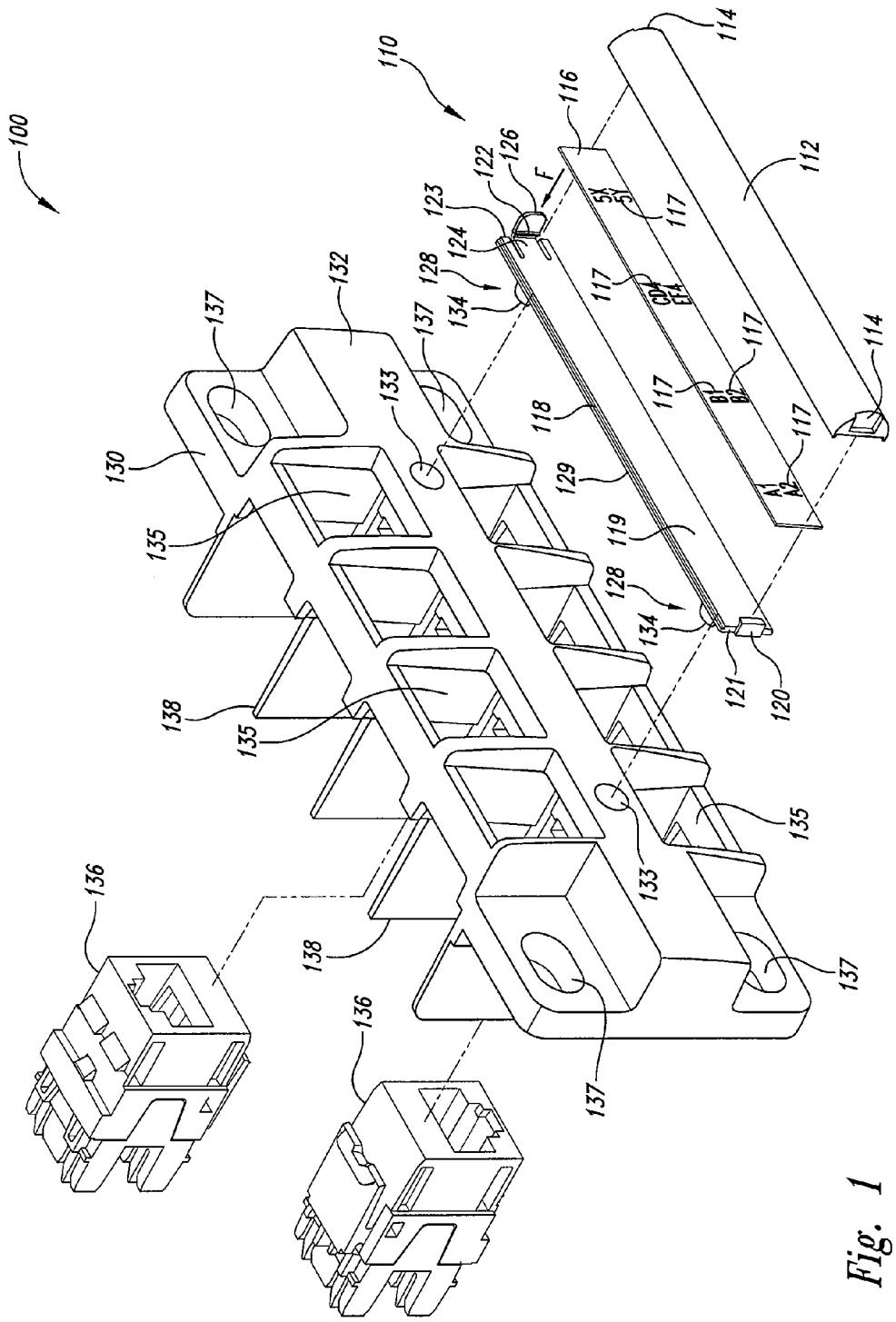
FIG. 1 is an exploded isometric front view of a first combination of a first label implementation and a first multi-port station.

A first combination 100 is shown in FIG. 1 to include a first label implementation 110 having an elongated transparent cover 112 with end-notches 114, and elongated label media 116, such as being made from paper, card stock, plastic or other material that can be marked with either a pencil, pen, marker, print device such as a printer, label maker, etc. The cover 112 can be formed as a lens with or without magnification aspects to aid in displaying alpha-numeric characters, signs, symbols, or other information on the label media 116 such as marks 117. The first label implementation 110 also includes an elongated backing 118 having a front surface 119 to receive the label media 116. The first label implementation 110 has a first end-fastener 120 position on a first end 121 and extending away from the front surface 119 to be engageable with one of the end-notches 114 and has a second end-fastener 122 positioned on a second end 123 and extending away from the front surface to be engageable with the other of the end-notches 114. The second end-fastener 122 is coupled with a leaf spring portion 124 of the backing 118 that is kept in tension as the second end-fastener is engaged with the end-notch 114. The second end-fastener 122 is coupled to a push-tab 126 that is positioned to receive a force, F, from a user to disengage the second end-fastener 122 with the end-notch 114.

The backing 118 further includes pegs 128 (better shown in FIG. 2) that extend from a back surface 129 of the backing 118 to be engageable with a first multi-port station 130 shown in FIG. 1. The first multi-port station 130 includes a centrally located longitudinal support 132 with holes 133 sized and positioned to receive the pegs 128 for engagement of the first label implementation 110 with the first multi-port station 130. Each of the pegs 128 has two split-portions 134 that are kept in tension to further secure the peg in the hole 133 when the first label implementation 110 is engaged with the first multi-port station 130.

Figure 3:
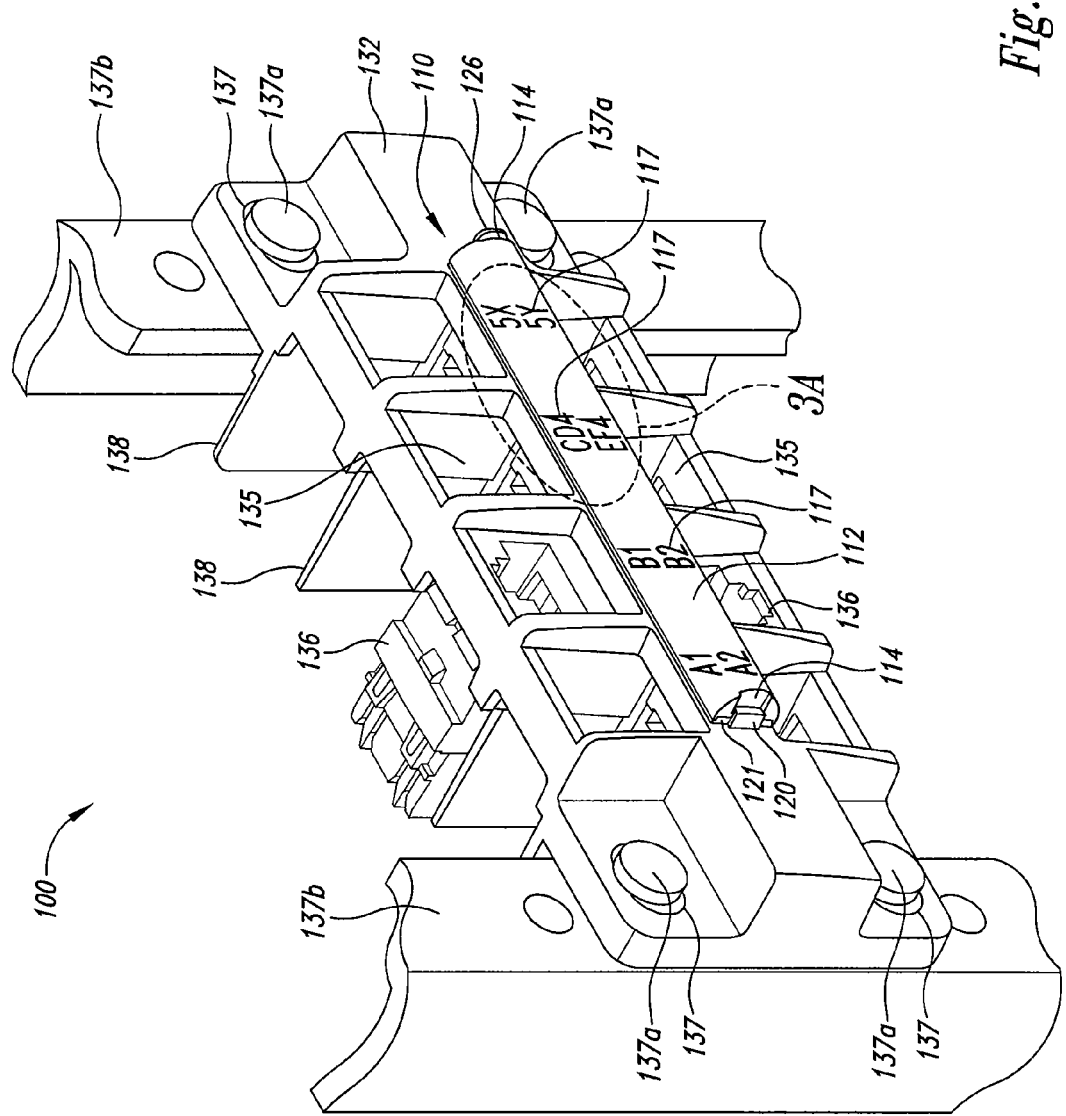
FIG. 3 is an isometric front view of the first combination of FIG. 1.
Figure 3A:
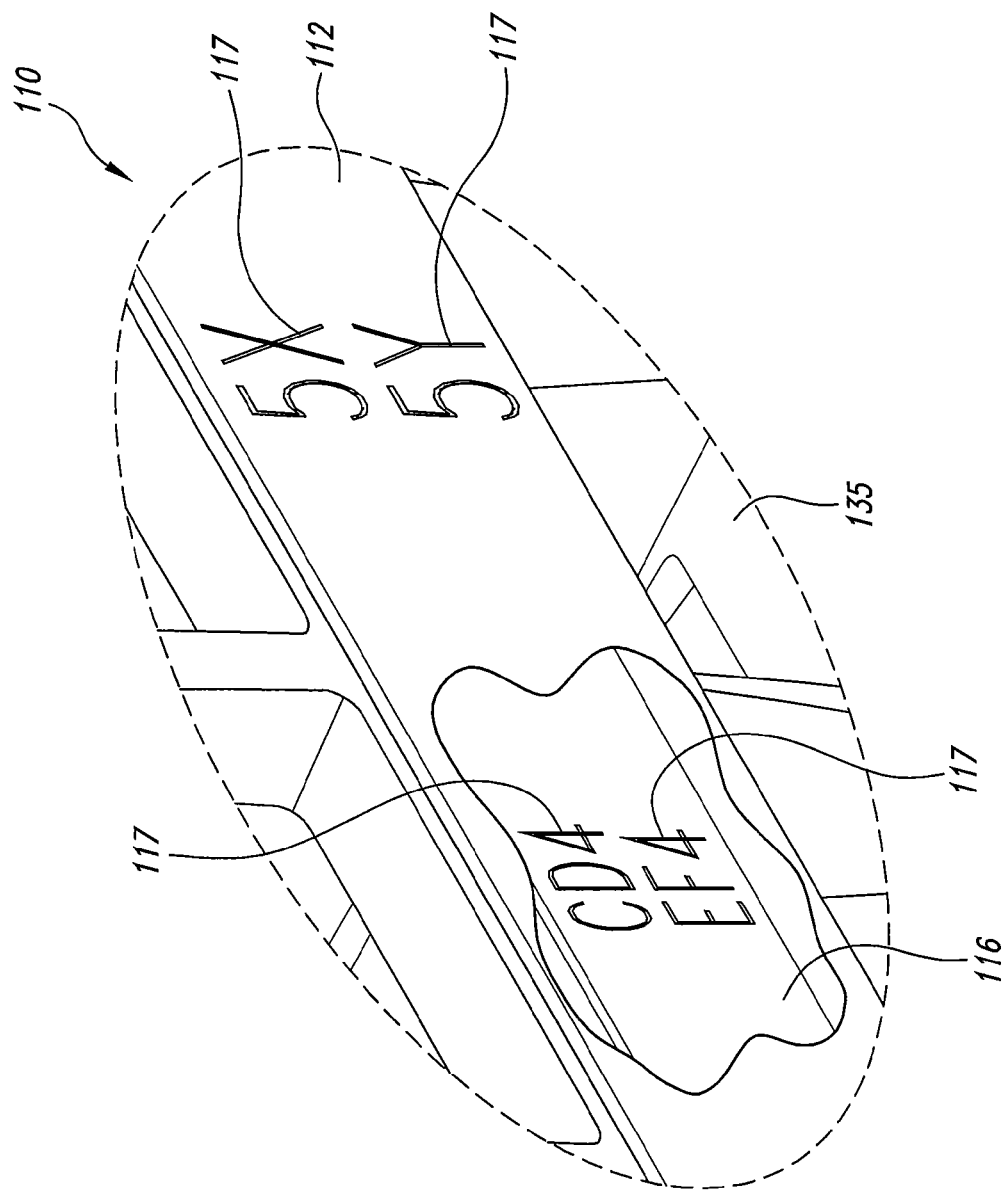
FIG. 3A is an isometric front view of the first combination of FIG. 1 with a portion of the cover removed.

The first label implementation 110 is shown in FIG. 3 as engaged with the first multi-port implementation 130. The first multi-port station 130 has rows of ports 135 on either side of the support 132 to receive connectors 136 as shown in FIG. 3. Placement of the first label implementation 110 is between the two rows of the ports 135 when the first label implementation is engaged with the first multi-port station 130. The cover 112 of the first label implementation 110 is depicted has being formed to provide visual magnification of the marks 117 when the label media 116 is positioned adjacent the cover with the marks facing the cover. Each of the marks 117 are arranged on the label media 116 to be adjacent its respective one of the ports 135 when the first label implementation 110 is engaged with the first multi-port implementation 130. A portion of the cover 112 is removed in FIG. 3A to expose a portion of the label media 116 having two of the depicted marks 117, "CD4" and "EF4", in a visually unmagnified condition as compared with two of the other marks, "5X" and "5Y", shown in FIG. 3A as covered and consequently having a magnified visual presentation.

Figure 2:
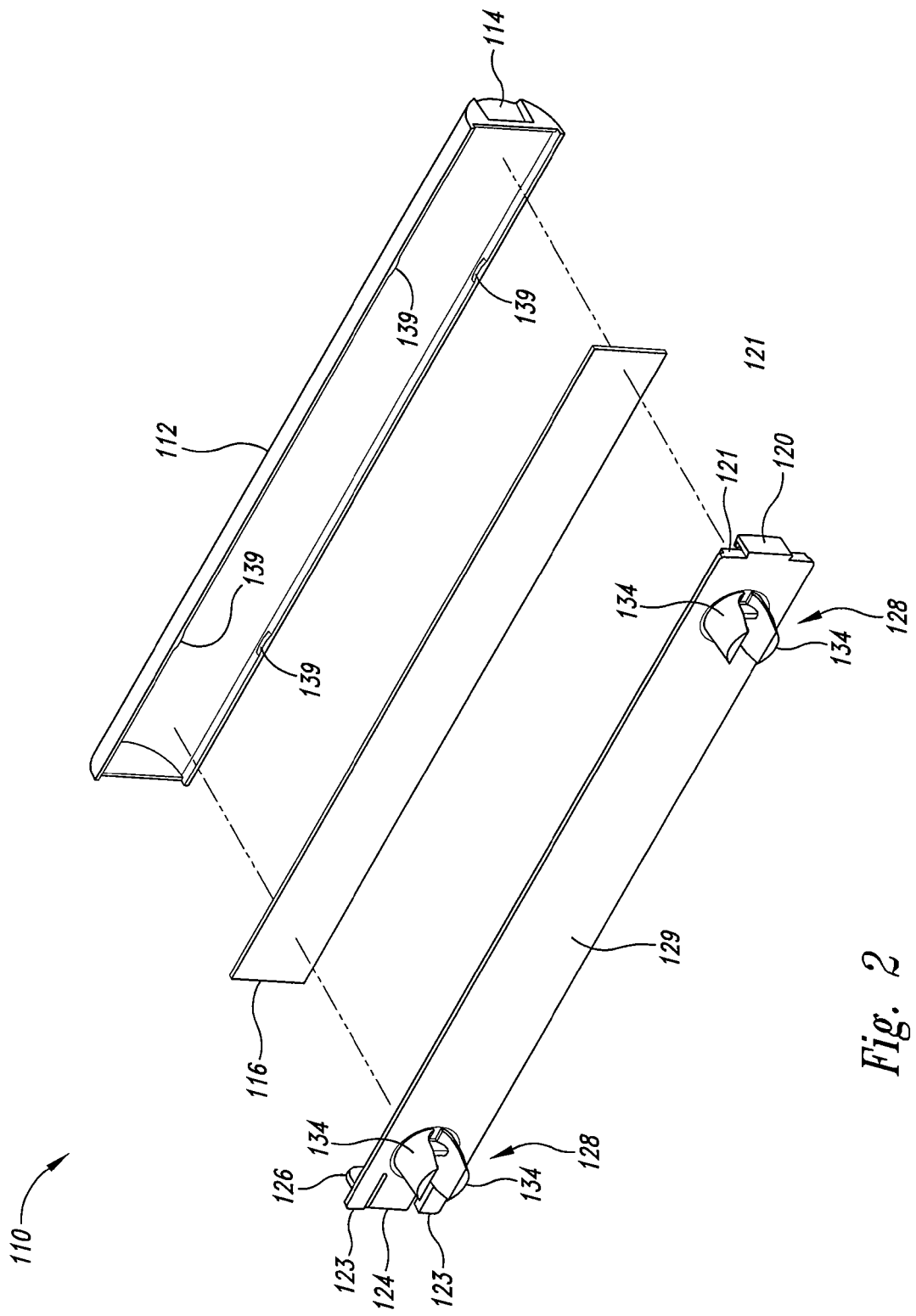
FIG. 2 is an exploded isometric rear view of the first labeling implementation of FIG. 1.

The first multi-port station 130 has openings 137 to receive bolts 137a to horizontally mount the first multi-port station to a rack 137b or other support structure. The first multi-port station 130 also includes shields 138 to allow for relatively close spacing of the connectors 136 with one another while reducing crosstalk. As shown in FIG. 2, the cover 112 has projections 139 to help retain the label media 116 inside of the cover 112.

Figure 4:
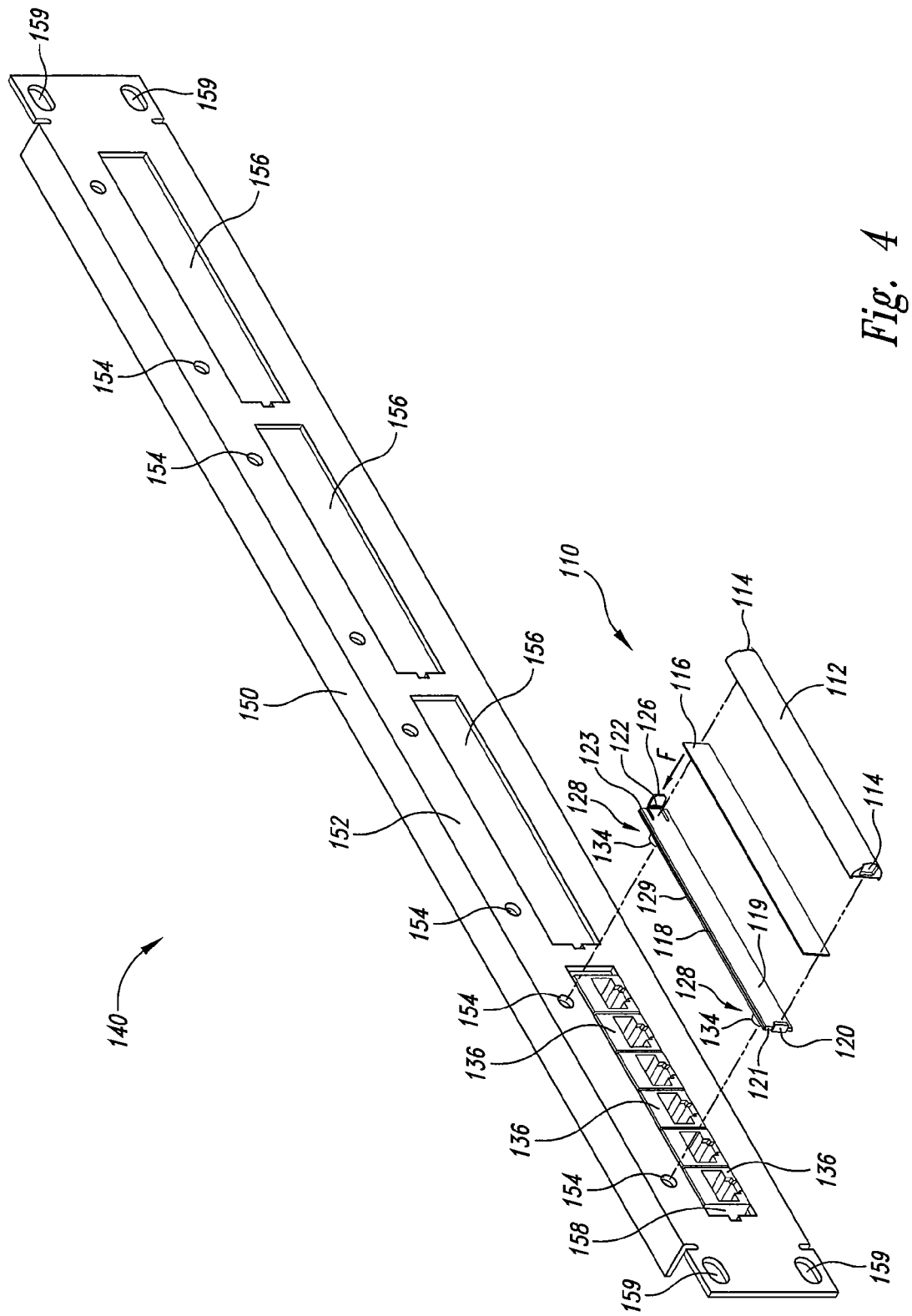
FIG. 4 is an exploded isometric front view of a second combination of the first label implementation and a second multi-port station.
Figure 5:
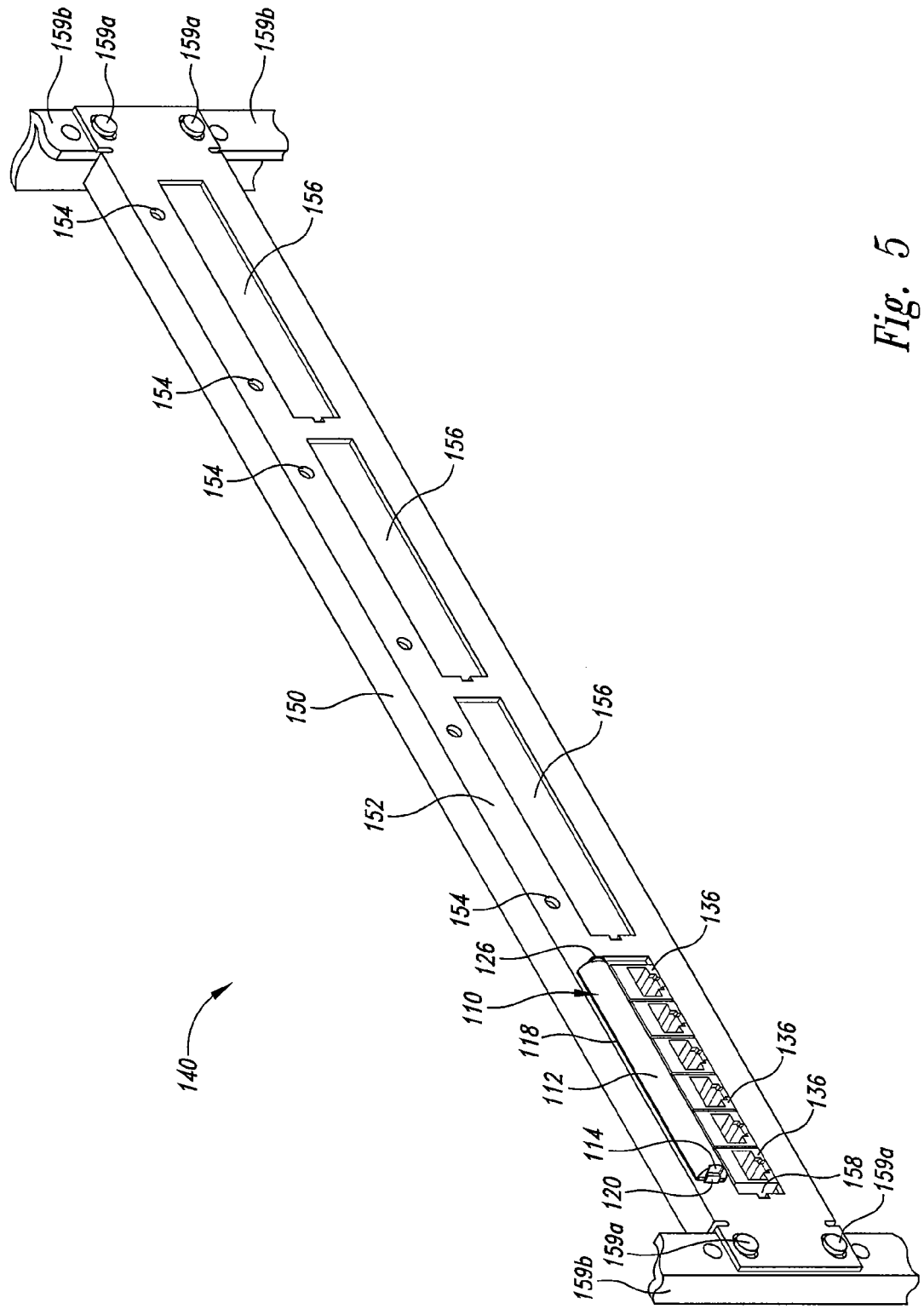
FIG. 5 is an isometric front view of the second combination of FIG. 4.

A second combination 140 is shown in FIG. 4 and FIG. 5 as having an instance of the first label implementation 110 and a second multi-port station 150. The second multi-port station 150 has a front surface 152 with holes 154 sized and spaced to receive the pegs 128 for engagement of the first label implementation 110 with the second multi-port station. The second multi-port station furthermore has port bays 156, each shaped and sized to receive a connector set 158, which has a plurality of connectors 136. The holes 154 are positioned to center each of a plurality of the first label implementations 110 with respect to a different one of the port bays 156 in an adjacent position. The second multi-port station 150 has openings 159 to receive bolts 159a for horizontal mounting with a rack 159b or other support structure, as shown in FIG. 5.

A third combination 160 is shown in FIG. 6 and FIG. 7 as having an instance of the first label implementation 110 and a third multi-port station 170. The third multi-port station 170 has a front surface 172 with the holes 154 sized and spaced to receive the pegs 128 in a vertical orientation for engagement of the first label implementation 110 with the third multi-port station. The third multi-port station 170 also has the port bays 156, each shaped and sized to receive one of the connector sets 158 in a vertical orientation having a plurality of connectors, such as the connectors 136 or other connectors. The holes 154 are positioned to center each of a plurality of the first label implementations 110 with respect to a different one of the port bays 156 in an adjacent position. The third multi-port station 170 has notches 174 for mounting in a vertical orientation with a rack 176 or other support structure.

Figure 8:
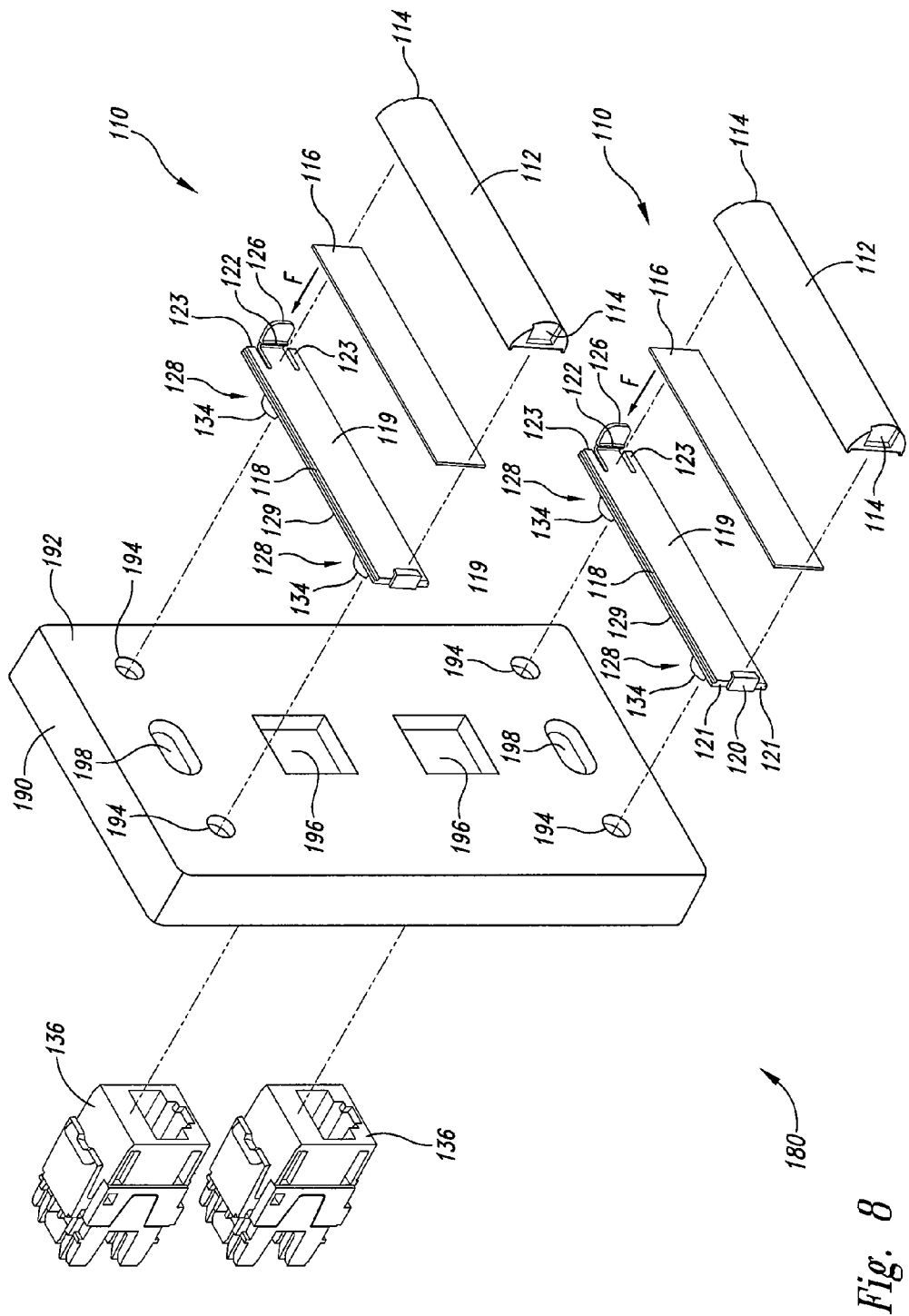
FIG. 8 is an exploded isometric front view of a fourth combination of the first label implementation of FIG. 1 and a fourth multi-port station.
Figure 9:
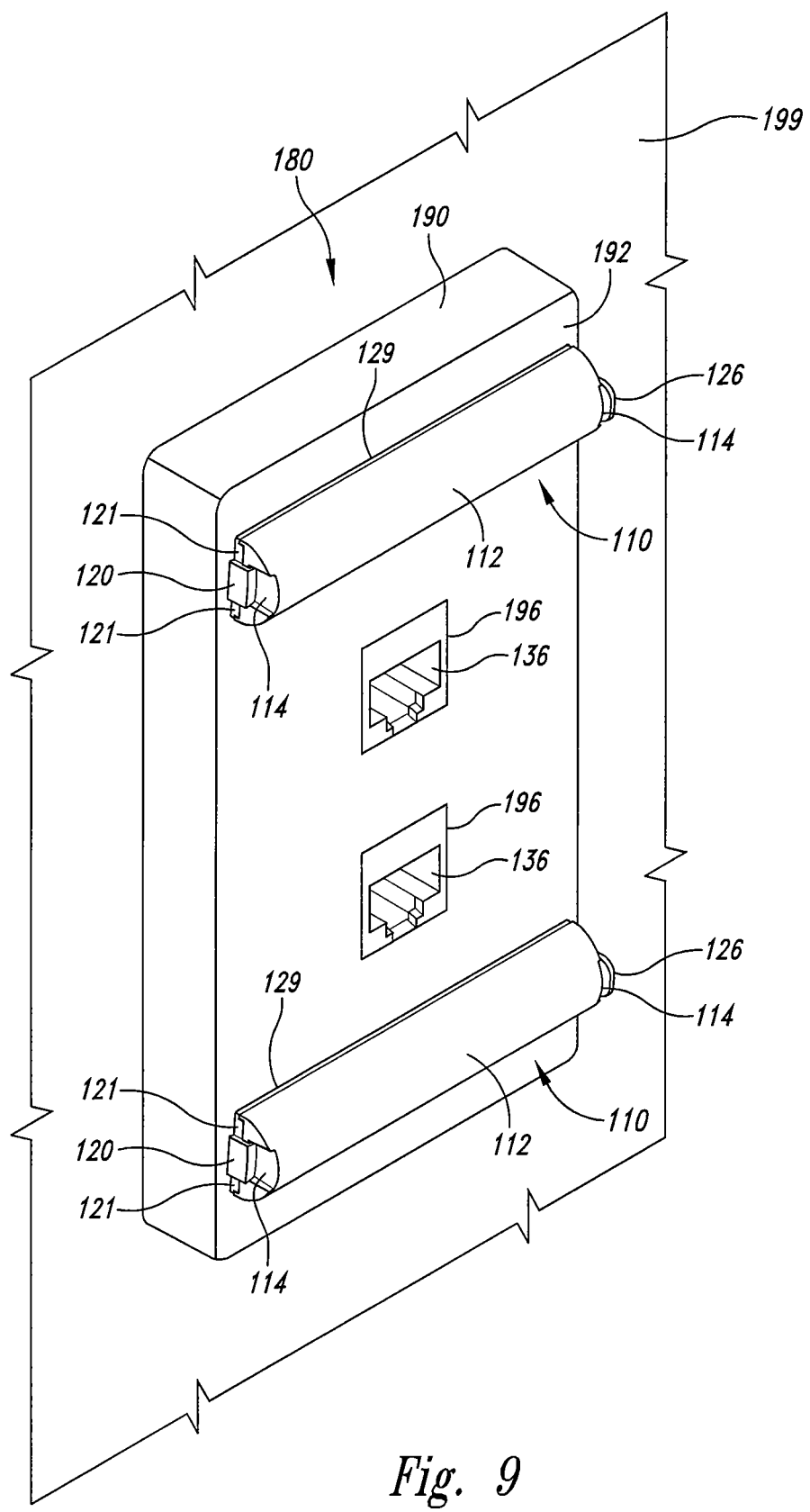
FIG. 9 is an isometric front view of the fourth combination of FIG. 8.

A fourth combination 180 is shown in FIG. 8 and FIG. 9 as having an instance of the first label implementation 110 and a fourth multi-port station 190. The fourth multi-port station 190 has a front surface 192 with holes 194 sized and spaced to receive the pegs 128 of the first label implementation 110. The holes 194 are arranged for a horizontal orientation of the first label implementation 110 with respect to the fourth multi-port station 190. The fourth multi-port station 190 has two ports 196, each shaped and sized to receive a connector, such as one of the connectors 136 or other connectors. The holes 194 are positioned to horizontally center each of two of the first label implementations 110 with respect to a different one of the two ports 196 in an adjacent position. The fourth multi-port station 170 also has openings 198 for mounting at a wall 199.

Figure 10:
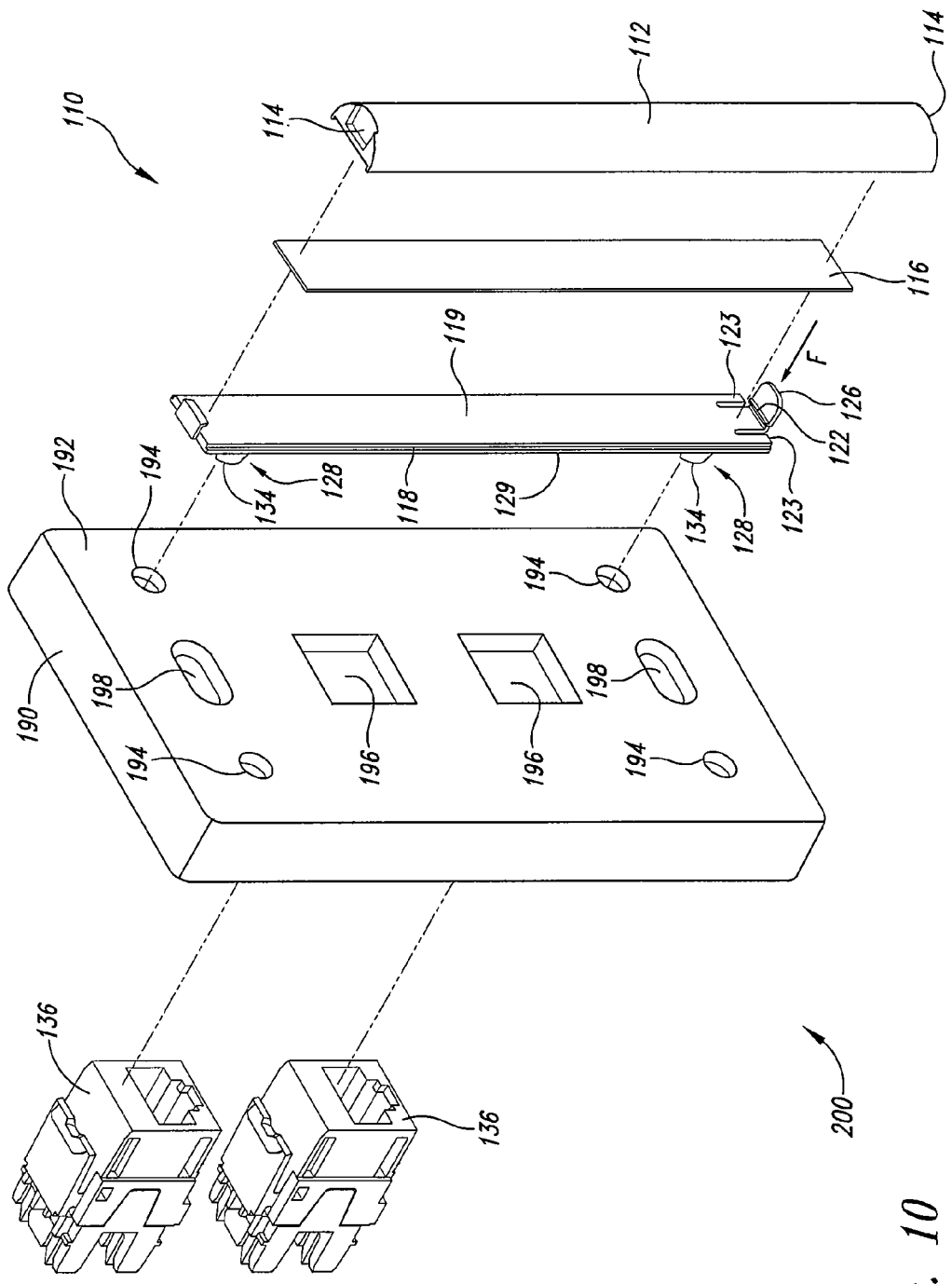
FIG. 10 is an exploded isometric front view of a fifth combination of the first label implementation of FIG. 1 and the fourth multi-port station of FIG. 8.
Figure 11:
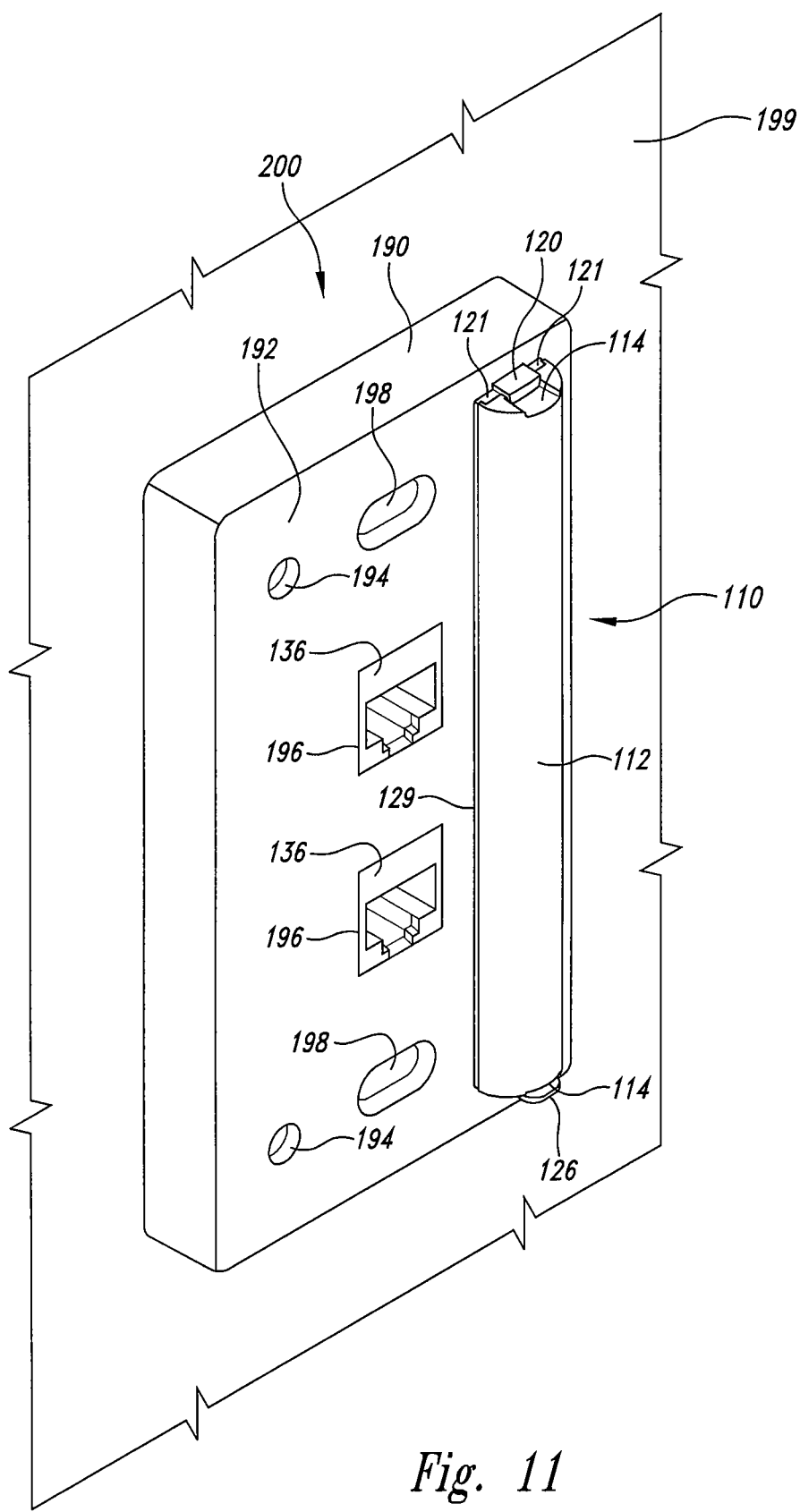
FIG. 11 is an isometric front view of the fifth combination of FIG. 10.

A fifth combination 200 is shown in FIG. 10 and FIG. 11 as having an instance of the first label implementation 110 and the fourth multi-port station 190. The pegs 128 of the first label implementation 110 are spaced to match the spacing of the holes 194 of the fourth multi-port station 190 and arranged for a vertical orientation of the first label implementation with respect to the fourth multi-port station. The holes 194 are positioned to vertically center each of two first label implementations 110 with respect to both of the two ports 196 a position adjacent to both.

Figure 12:
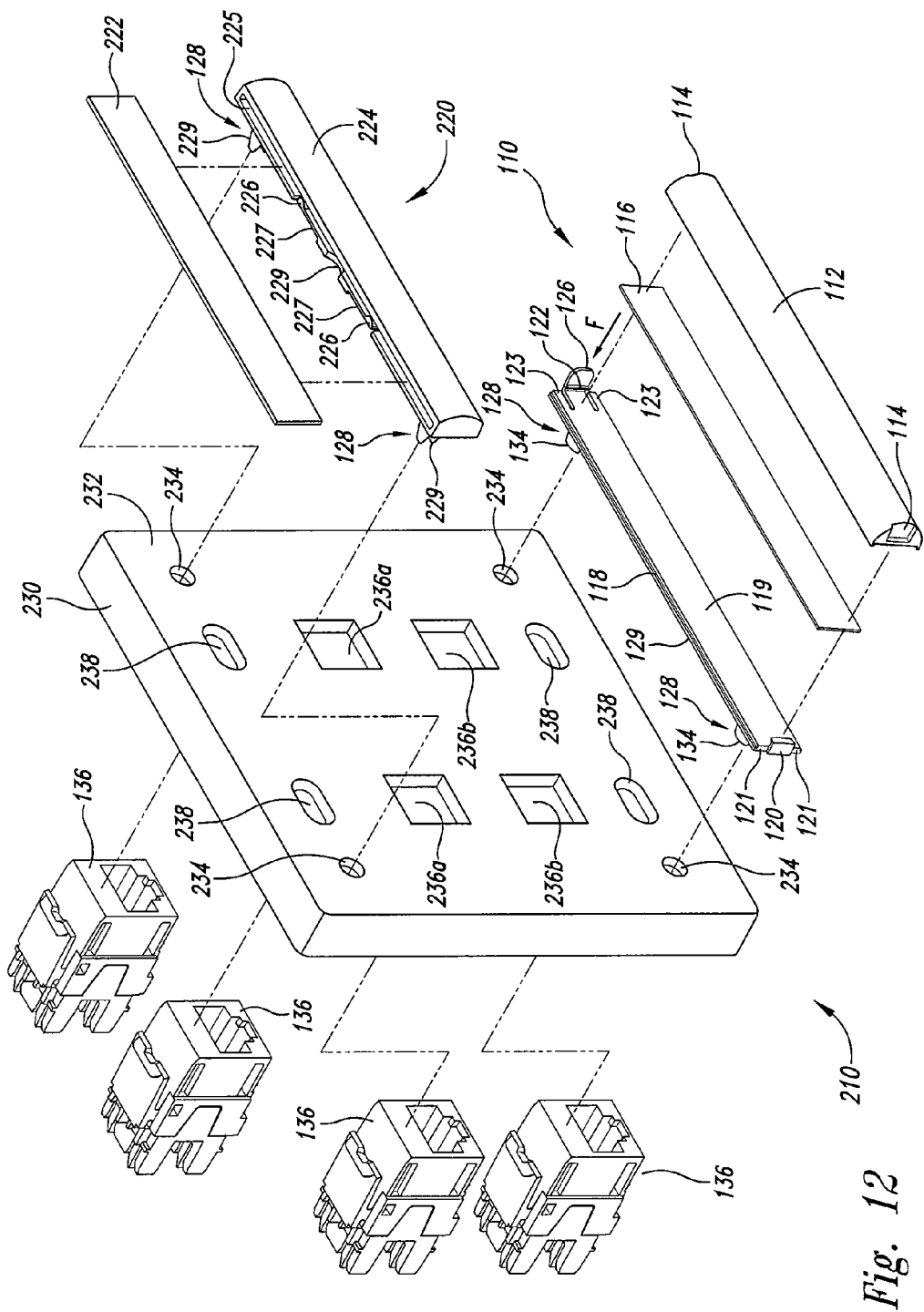
FIG. 12 is an exploded isometric front view of a sixth combination of the first label implementation, a second label implementation and a fifth multi-port station.
Figure 13:
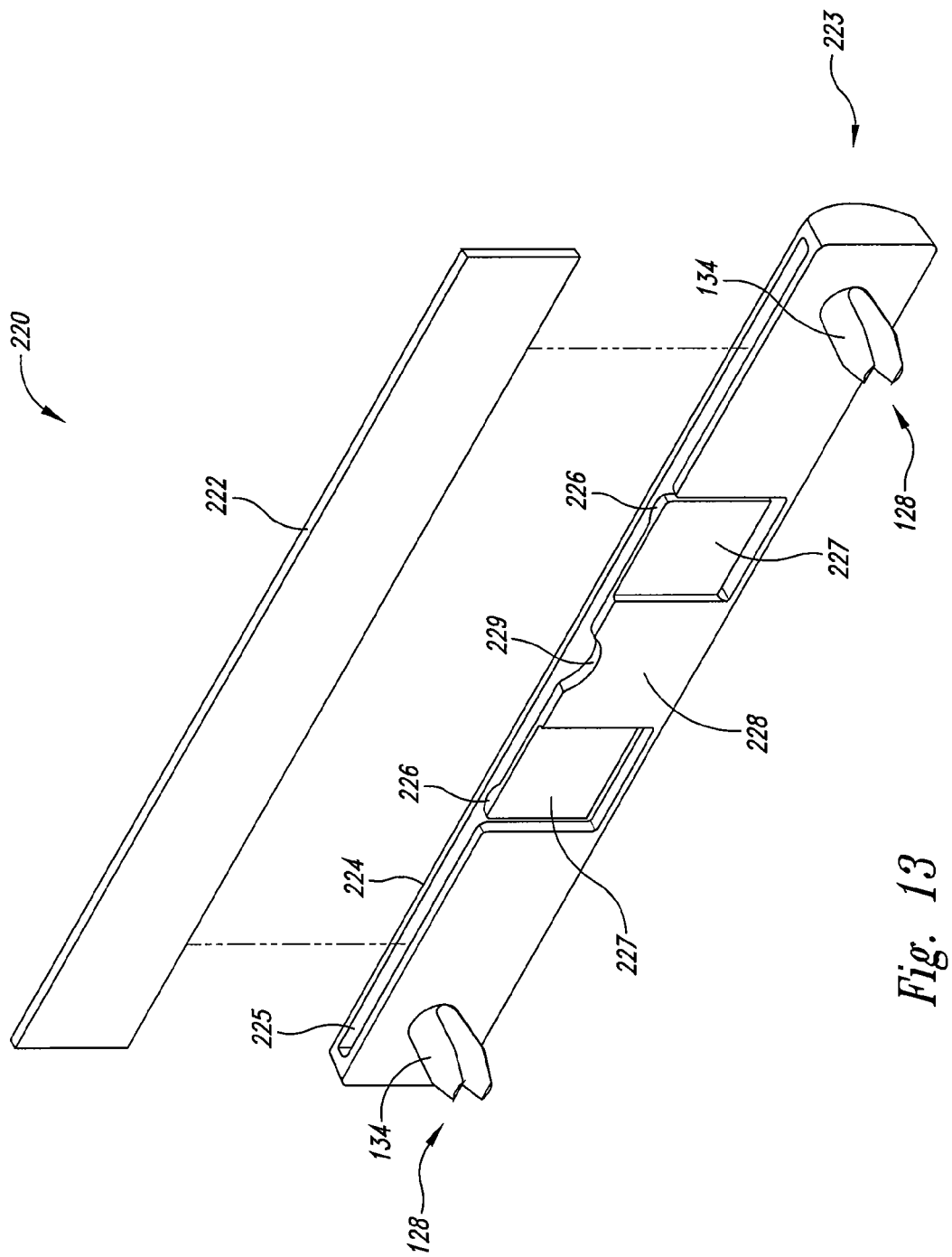
FIG. 13 is an exploded isometric rear view of the second label implementation of FIG. 12.
Figure 14:
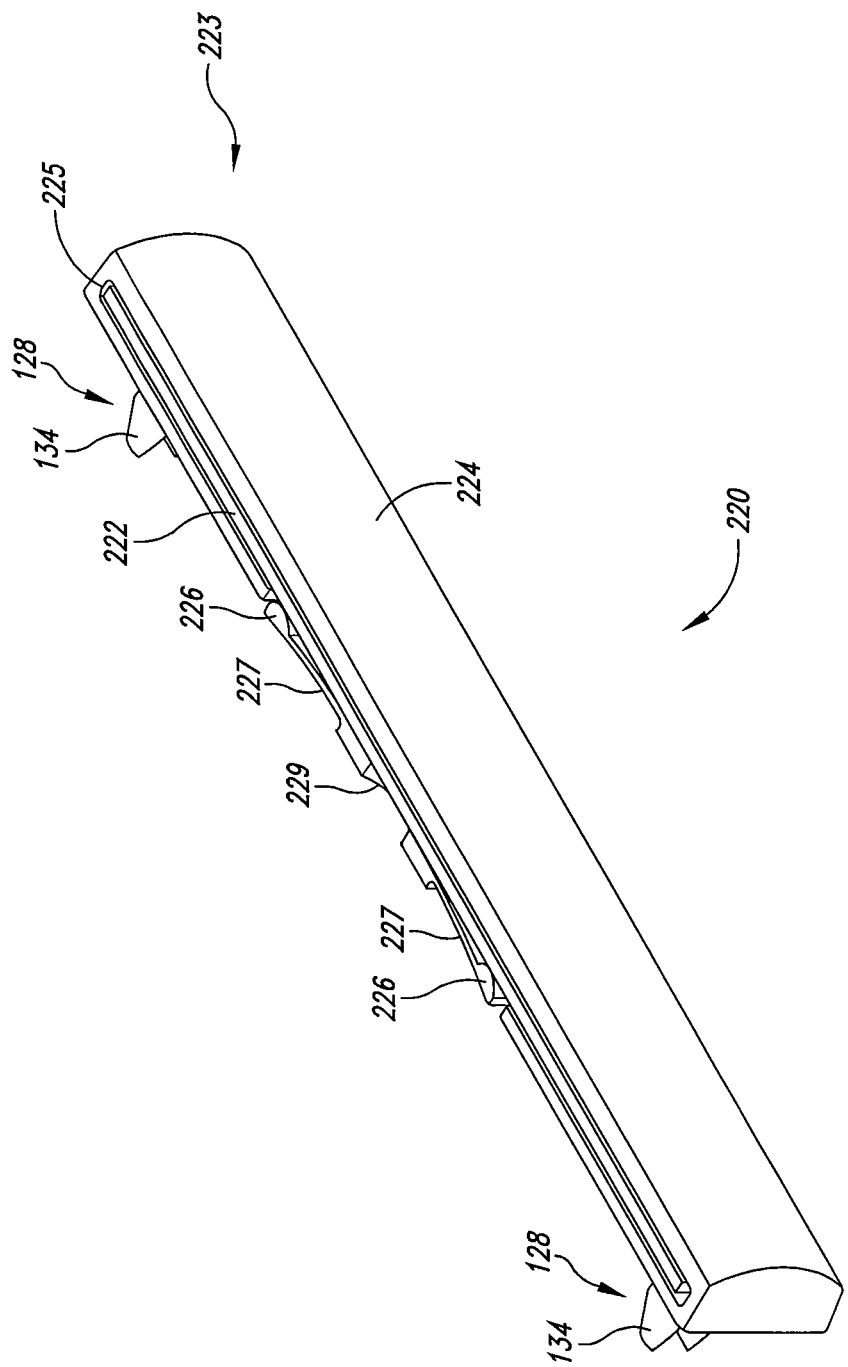
FIG. 14 is an isometric front view of the second label implementation of FIG. 12.
Figure 15:
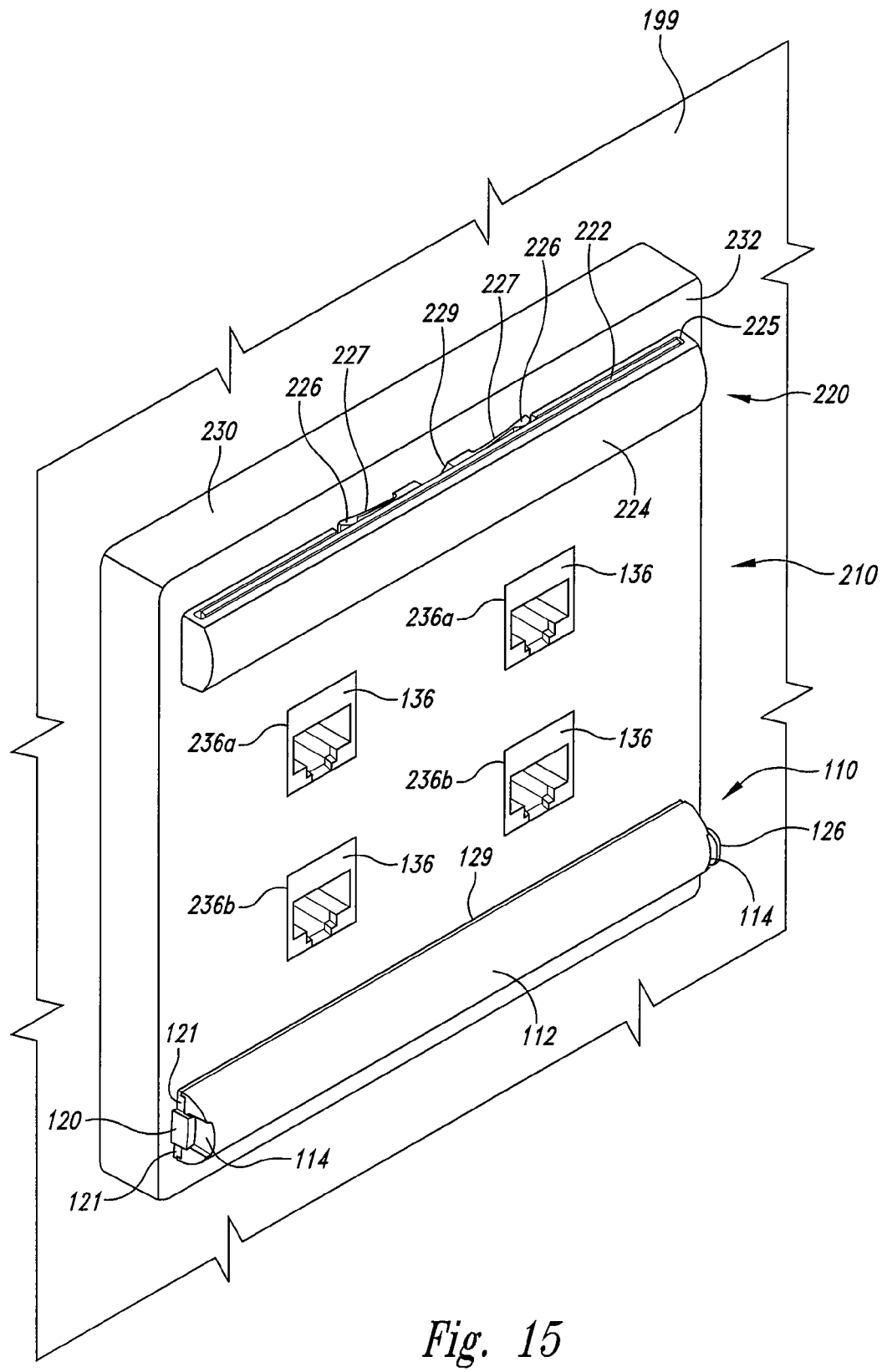
FIG. 15 is an isometric front view of the sixth combination of FIG. 12.

A sixth combination 210 is shown in FIG. 12 and FIG. 15 as having an instance of the first label implementation 110, a second label implementation 220 (also shown in FIG. 13 and FIG. 14) and a fifth multi-port station 230. The second label implementation 220, better shown in FIG. 13, includes a label media 222 and a holder 223 with a transparent cover portion 224 and a slot 225. The holder 223 receives the label media 222 into the slot 225 to be held in position with contact portions 226 of tensioned members 227 that extend from a central rear portion 228. The central rear portion 228 has a notch 229 to provide additional access for removal of the label media 222 from the holder 223. The fifth multi-port station 230 has a front surface 232 with two pairs of horizontally arranged holes 234 with one pair sized and spaced to receive the pegs 128 of the first label implementation 110 and the other pair sized and spaced to receive the peg 128 of the second label implementation 220. The holes 234 are arranged for a horizontal orientation of the first label implementation 110 and the second label implementation 220 with respect to the fifth multi-port station 230. The fifth multi-port station 230 has a first horizontal row of two ports 236a and a second horizontal row of two ports 236b, each port shaped and sized to receive a connector, such as one of the connectors 136 or other connectors. The holes 234 are positioned to horizontally center the first label implementation 110 and the second label implementation 220 with respect to different pairs of the two ports 236a and the two ports 236b. The fifth multi-port station 230 also has openings 238 for mounting at the wall 199.

Figure 16:
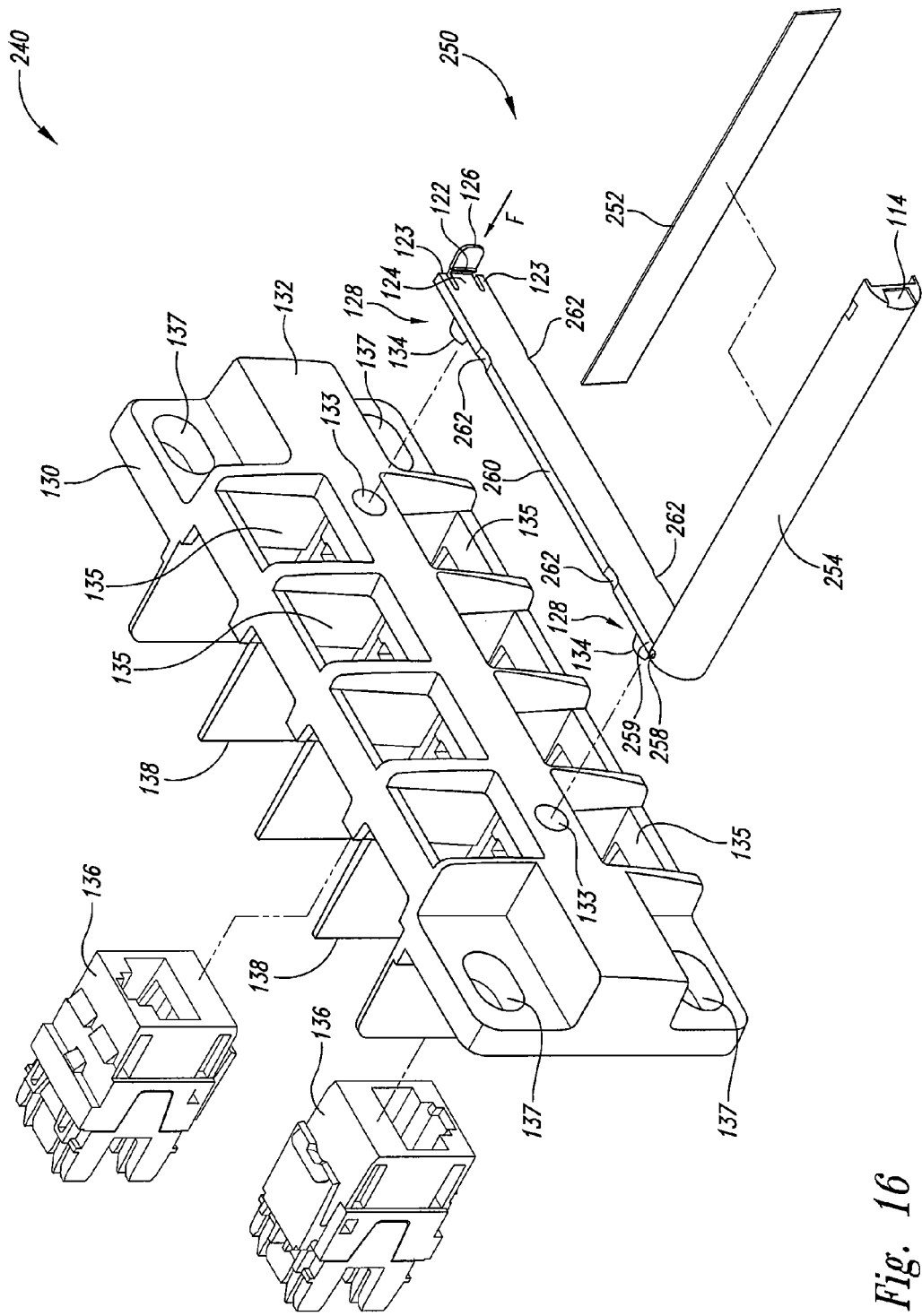
FIG. 16 is an exploded isometric front view of a seventh combination of a third label implementation and the first multi-port station of FIG. 1.
Figure 17:
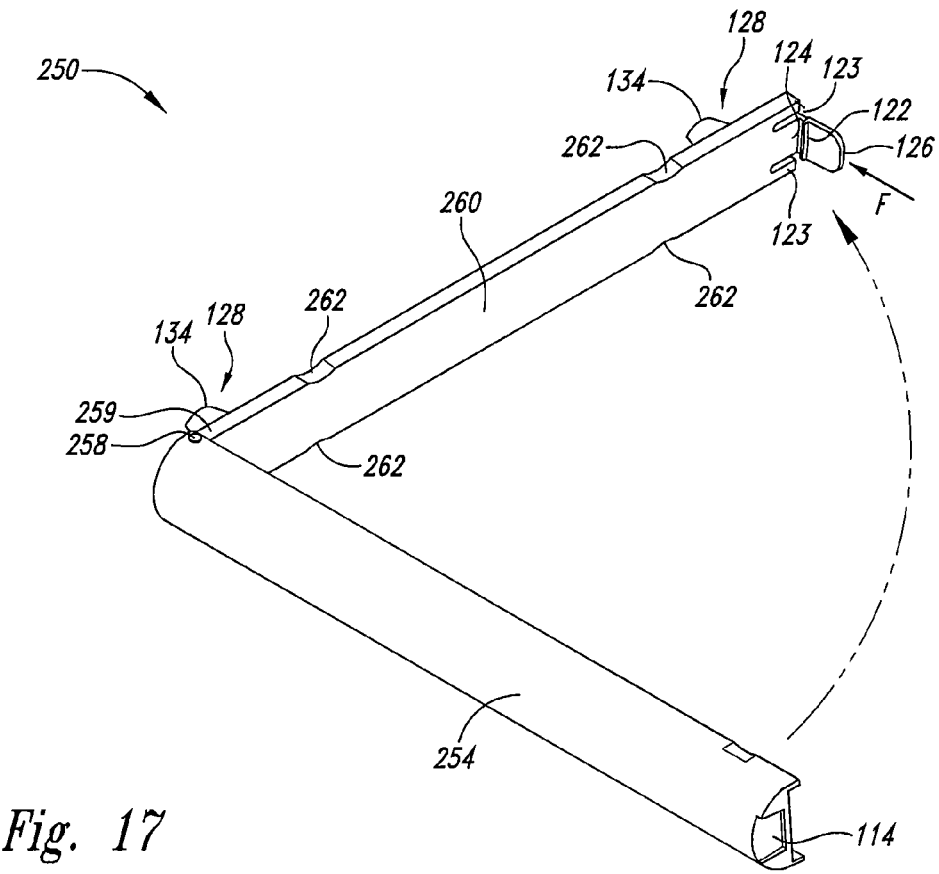
FIG. 17 is an isometric front view of the third label implementation of FIG. 16 in an open position.
Figure 18:
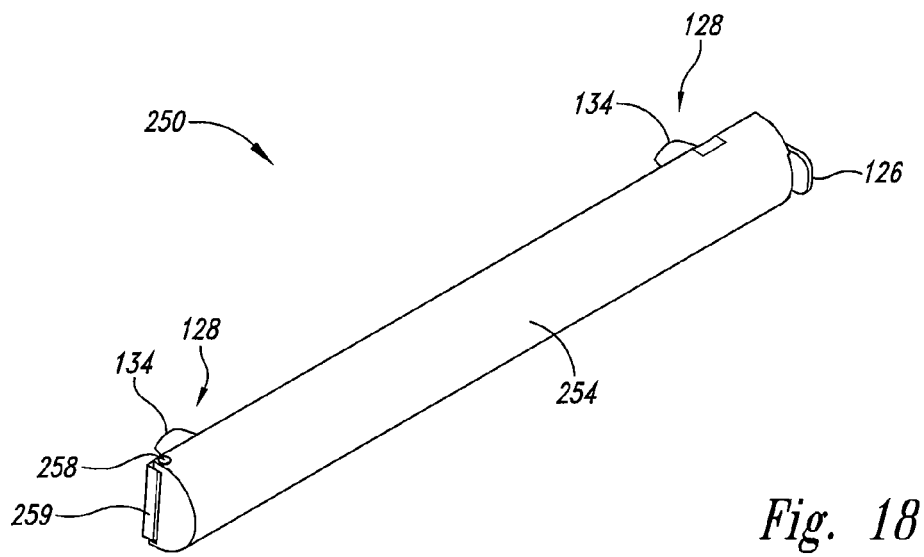
FIG. 18 is an isometric front view of the third label implementation of FIG. 16 in a closed position.
Figure 19:
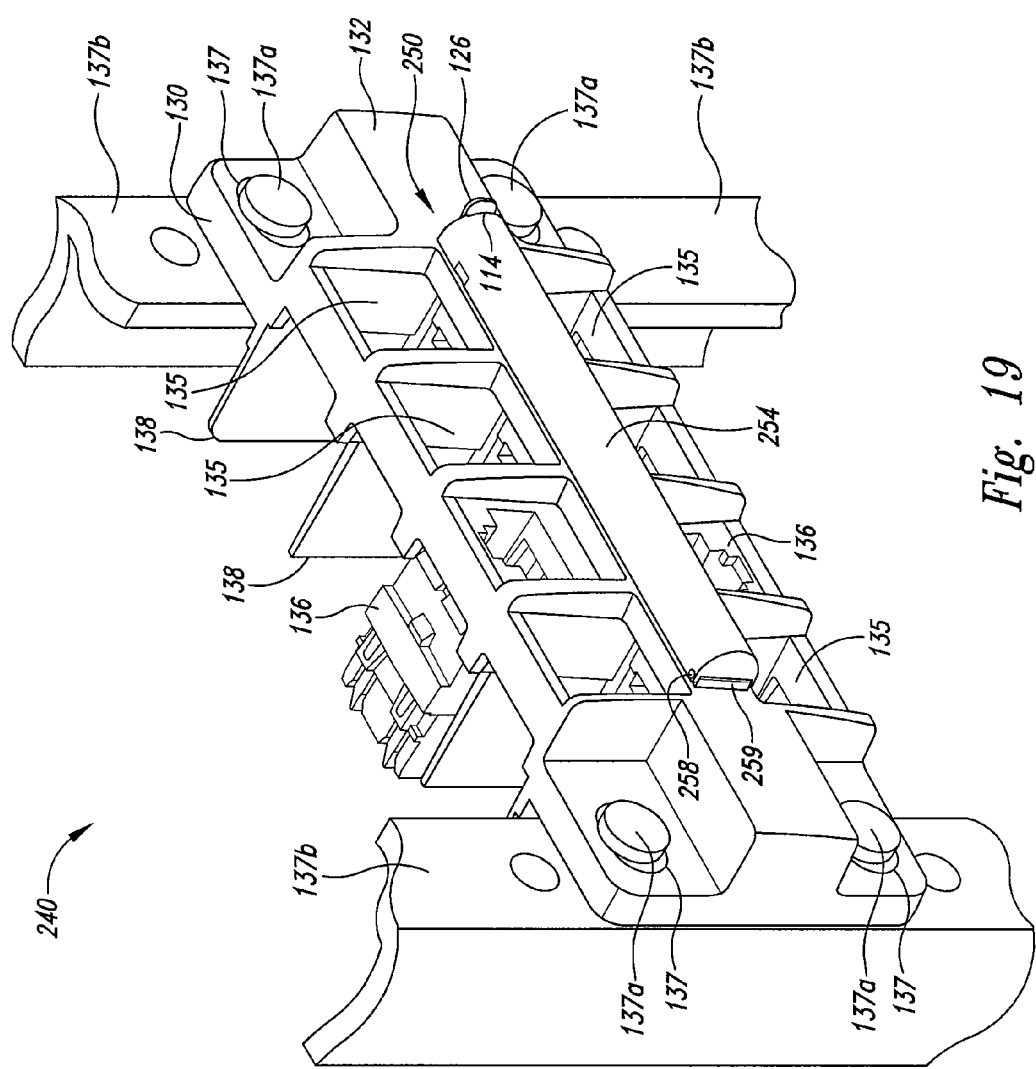
FIG. 19 is an isometric front view of the seventh combination of FIG. 16.

A seventh combination 240 is shown in FIG. 16 and FIG. 19 as having a third label implementation 250 (also shown in FIG. 17 and FIG. 18) and the first multi-port station 130. The third label implementation 250 has a label media 252 (such as a paper, card stock, plastic label or the like), and has an elongated transparent cover 254 sized to receive the label media therein. The cover 254 has one of the end-notches 114 at one end and is coupled by a hinge 258 on an other end 259 to a backing 260. The backing 260 has the second end-fastener 122 with the leaf spring portion 124 coupled to the push-tab 126. The one end-notch 114 receives and engages with the second end-fastener 122 when the cover 254 is moved to a closed position shown in FIG. 18. The backing 260 has notches 262 to provide clearance for tabs (not shown but similar to tabs 286 shown in FIG. 20) in the cover 254 when in the closed position. The tabs are used to help secure the label media 252 within the cover 254.

Figure 20:
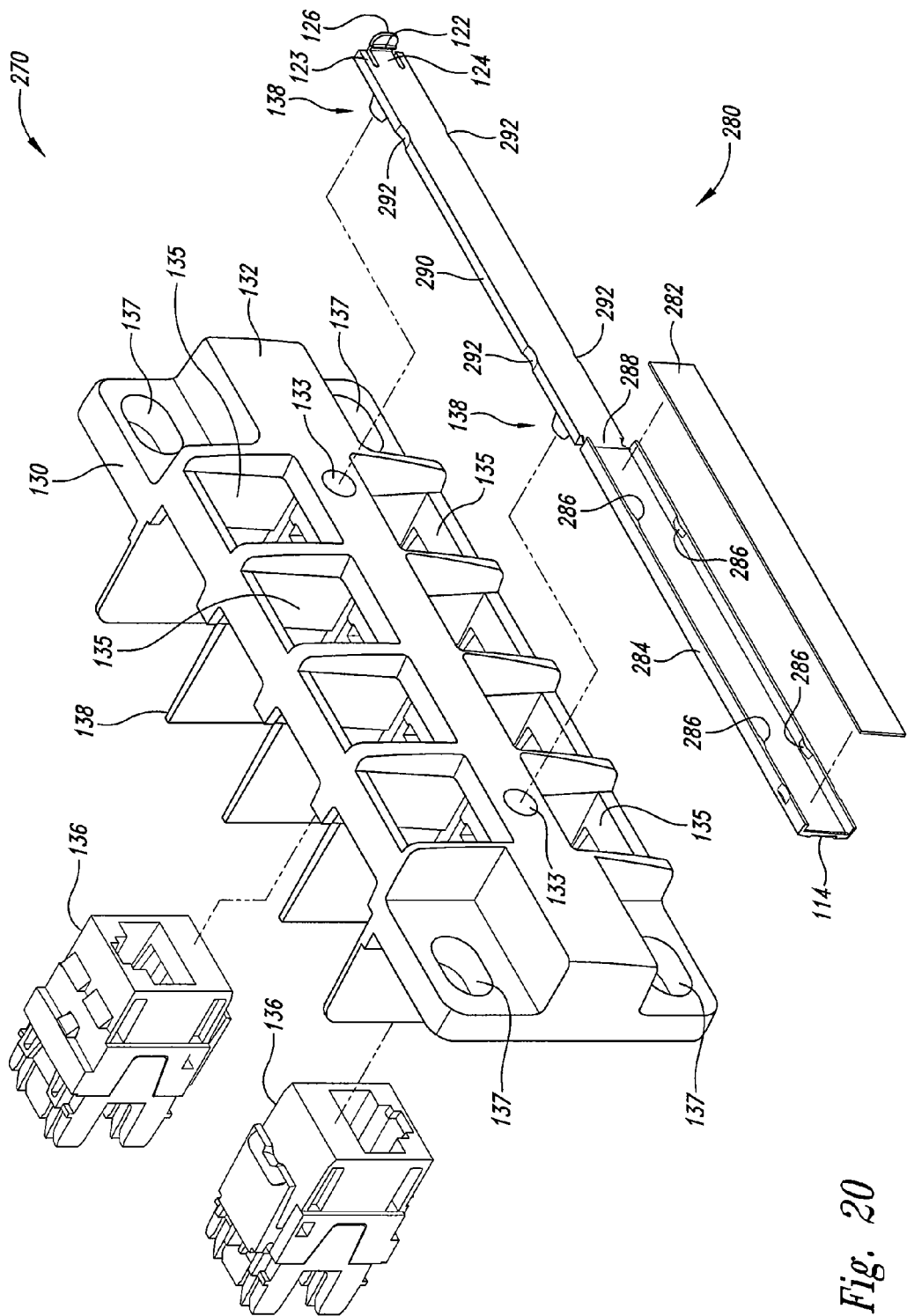
FIG. 20 is an exploded isometric front view of an eighth combination a fourth label implementation and the first multi-port station of FIG. 1.
Figure 23:
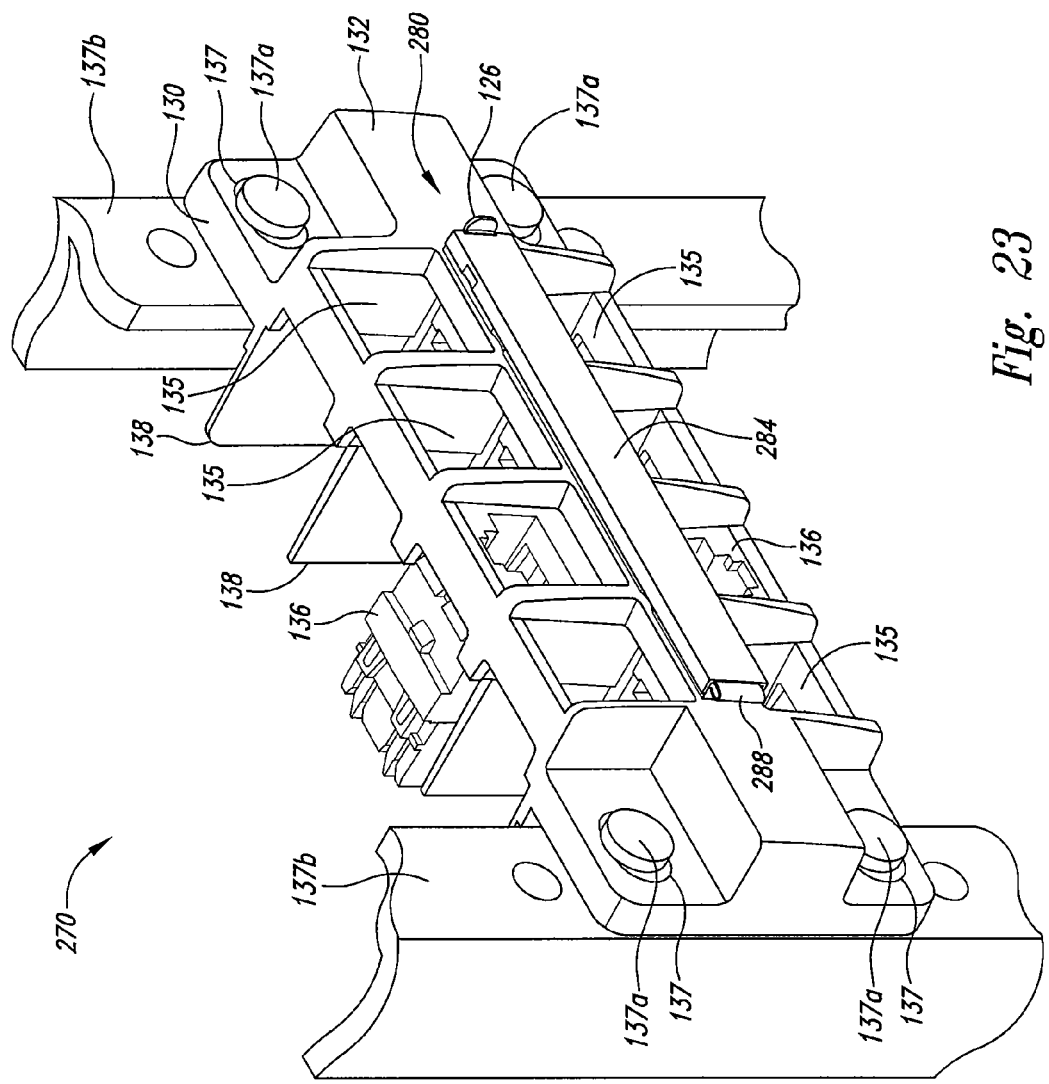
FIG. 23 is an isometric front view of the eighth combination of FIG. 20.

An eighth combination 270 is shown in FIG. 20 and FIG. 23 as having a fourth label implementation 280 (also shown in FIG. 21 and FIG. 22) and the first multi-port station 130. The fourth label implementation 280 has a label media 282 (such as a paper, card stock, plastic label or the like), and has an elongated transparent cover 284 sized to receive the label media therein. The transparent cover 284 has one of the end-notches 114 at one end and has tabs 286 to help secure the label media 282 inside the cover 284. The cover 284 has a single-piece hinge 288 on an other end coupling the cover to a backing 290. The backing 290 has the second end-fastener 122 with the leaf spring portion 124 coupled to the push-tab 126. The one end-notch 114 receives and engages with the second end-fastener 122 when the cover 284 is moved to a closed position shown in FIG. 22. The backing 290 has notches 292 to provide clearance for the tabs 286 when the cover 284 is in the closed position.

A ninth combination 300 is shown in FIG. 24 as having a sixth multi-port station 310 and a fifth label implementation 320. The sixth multi-port station 310 has four angled sections 312, each having the port bays 156 to receive the connector sets 158 and the holes 133 to receive the pegs 128 of the fifth label implementation 320. The sixth multi-port station 310 also has side extension members 320 for recessed positioning of the sixth multi-port station when secured in an equipment rack.

Figure 27:
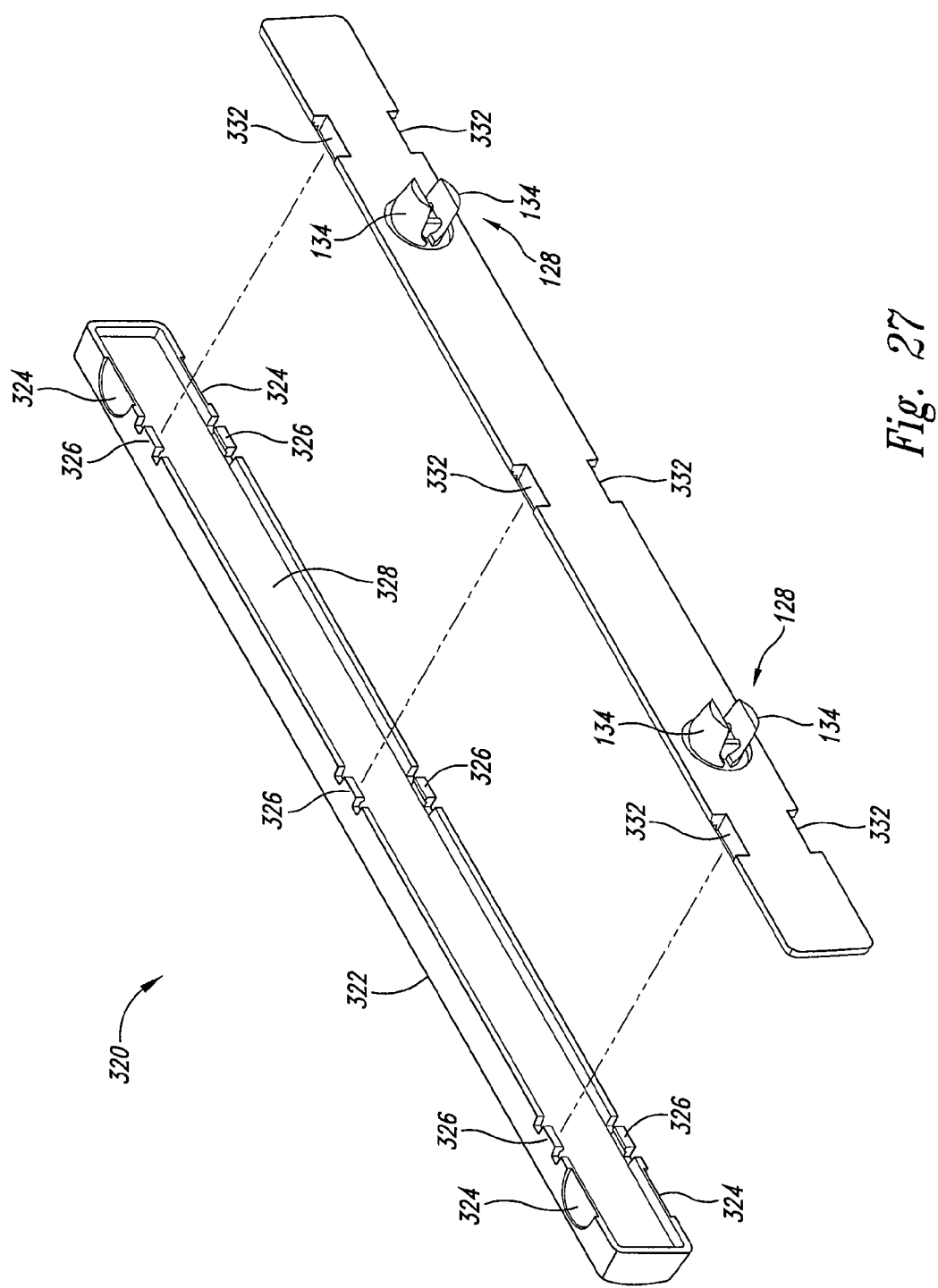
FIG. 27 is an exploded isometric rear view of the fifth label implementation of FIG. 24.

The fifth label implementation 320 is shown in FIG. 25, FIG. 26 and FIG. 27 as having an elongated transparent cover 322 with recessed grip areas 324 toward both ends. The cover 322 has clips 326 to receive a label media 328 and to engage with a backing 330 having notches 332 that receive the clips to secure the cover with the backing.

Figure 28:
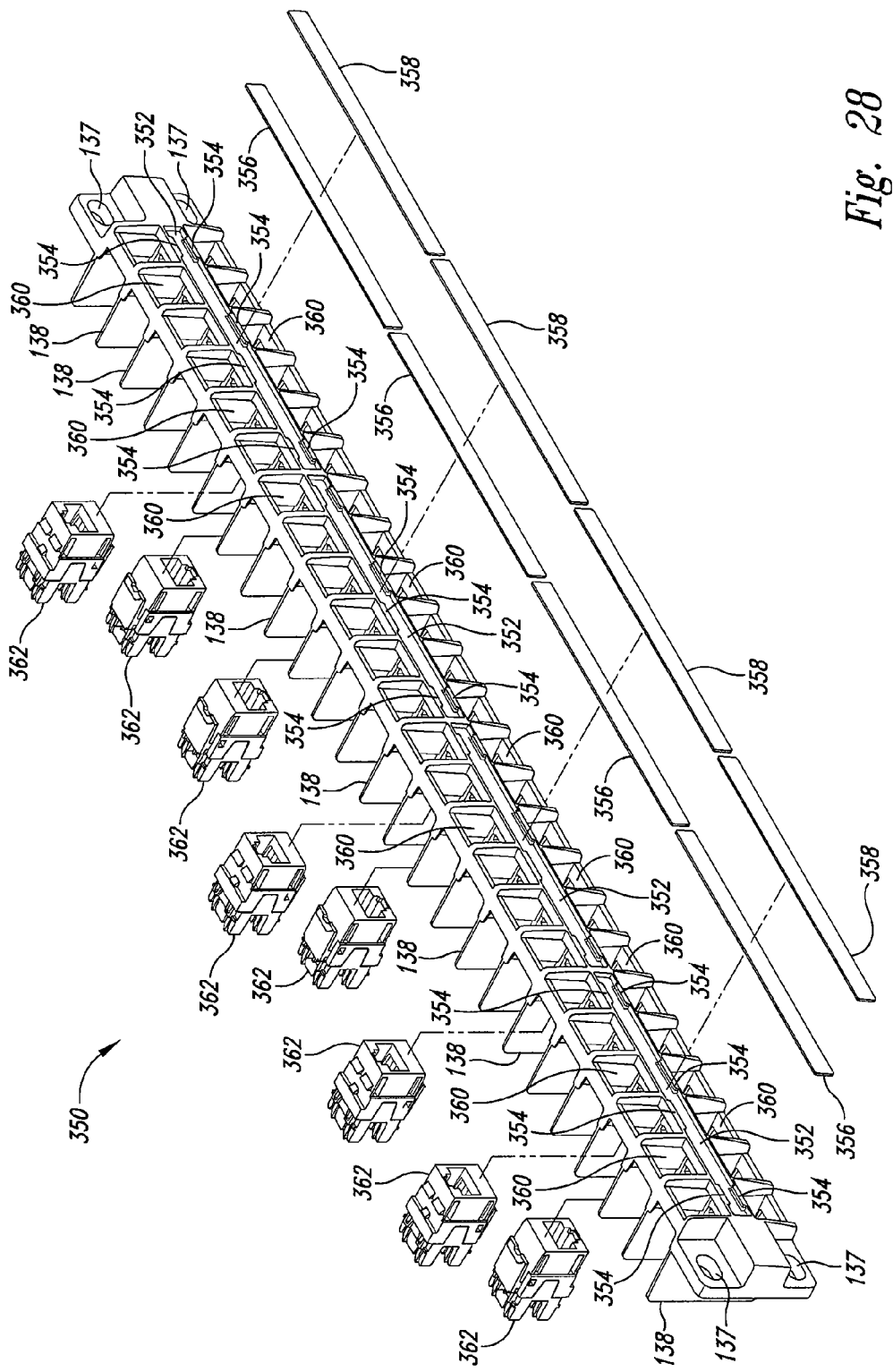
FIG. 28 is an exploded isometric front view of a tenth combination of a sixth label implementation and a seventh multi-port station.
Figure 29:
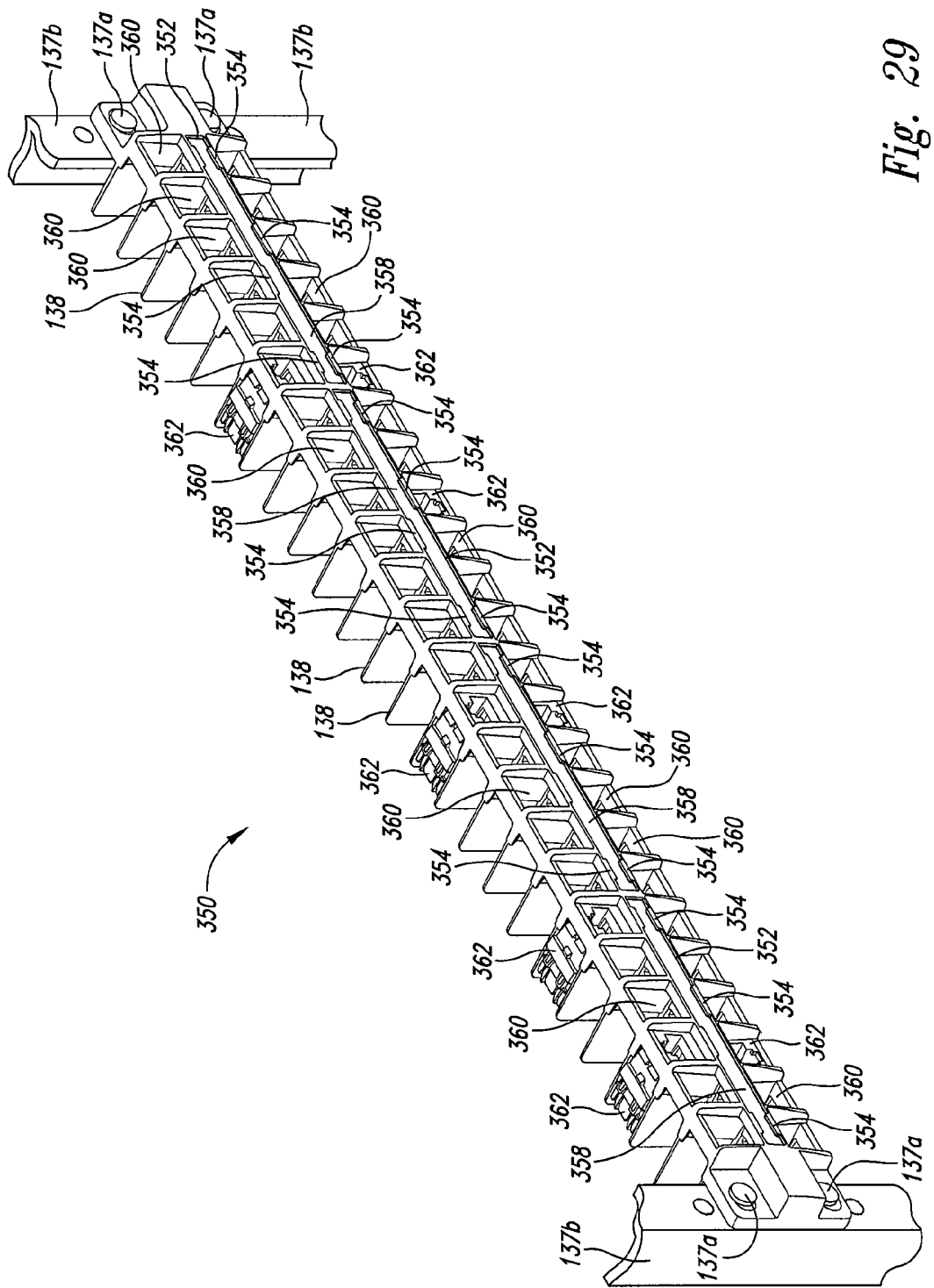
FIG. 29 is an isometric front view of the tenth combination of FIG. 28.

A tenth combination of a seventh multi-port station 350 and a sixth label implementation is shown in FIG. 28 and FIG. 29. The seventh multi-port station 250 has a mid-positioned elongated channel 352 with a series of tabs 354 to receive and secure a plurality of label media 356 and a corresponding plurality of transparent covers 358. The seventh multi-port station 350 has two rows of ports 360, one above and one below the elongated channel 352. The ports 360 are positioned and shaped to receive connectors 362 that are isolated from one another by the shields 138.

Figure 30:
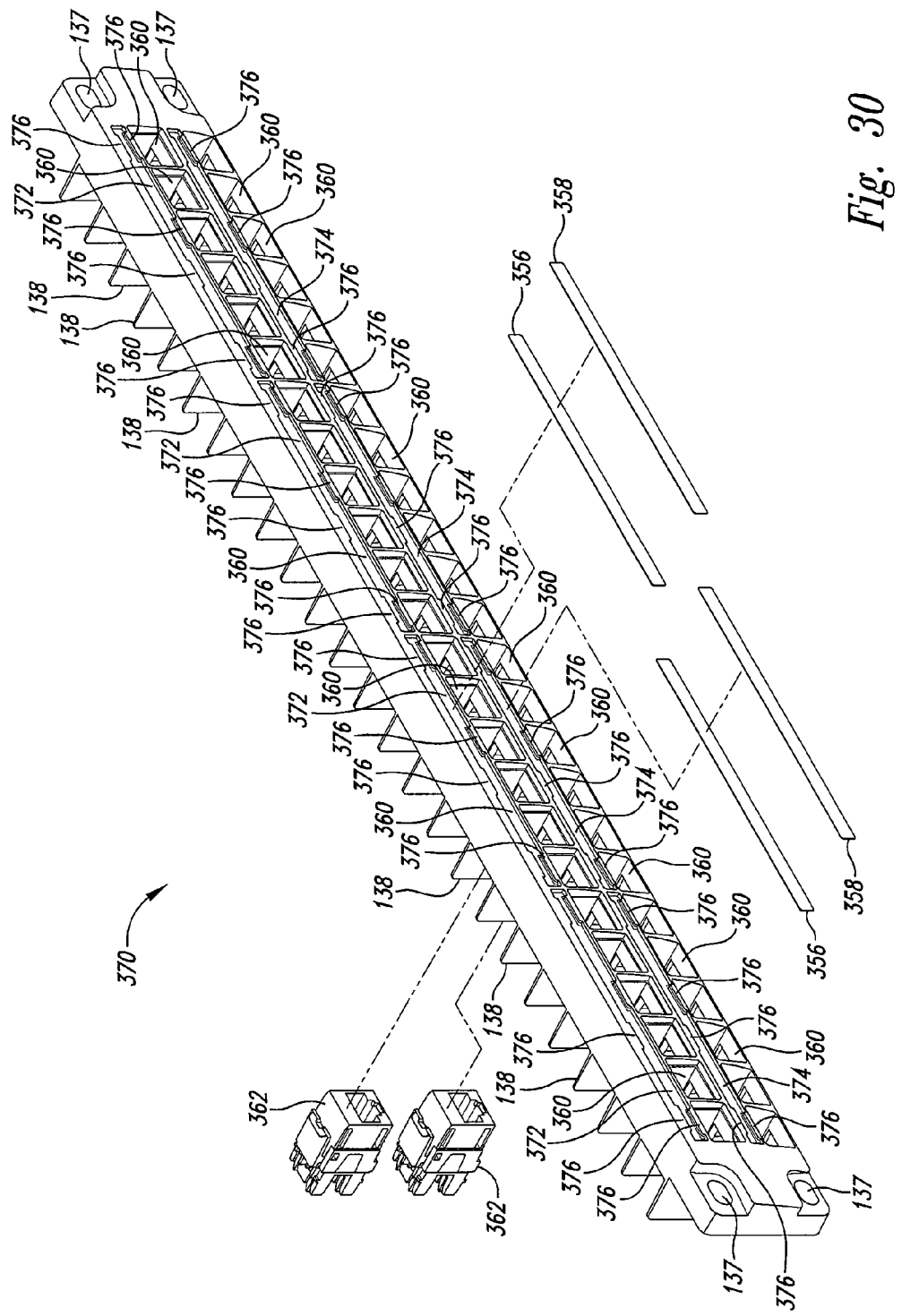
FIG. 30 is an exploded isometric front view of an eleventh combination of a seventh label implementation and an eighth multi-port station.
Figure 31:
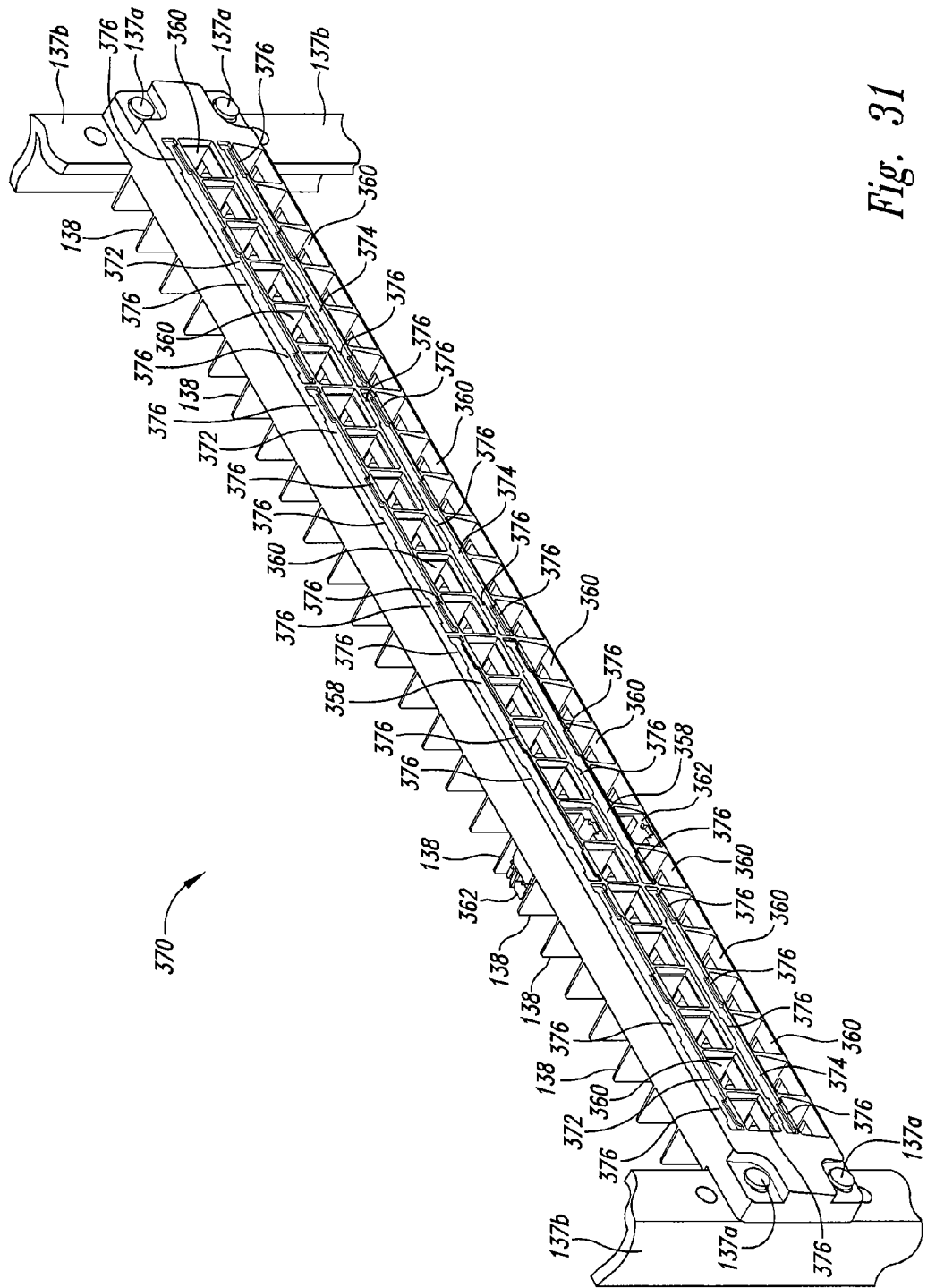
FIG. 31 is an isometric front view of the eleventh combination of FIG. 30.

An eleventh combination of an eighth multi-port station 370 and a seventh label implementation is shown in FIG. 30 and FIG. 31. The eighth multi-port station 370 has an upper channel 372 and a lower channel 374, each having a series of tabs 376 to receive and secure a plurality of label media 378 and corresponding plurality of transparent covers 380. The eighth multi-port station 370 has two rows of the ports 360, with the upper channel 372 serving identification purposes for the upper row of the ports and the lower channel 374 serving identification purposes for the lower row of the ports.

Figure 32:
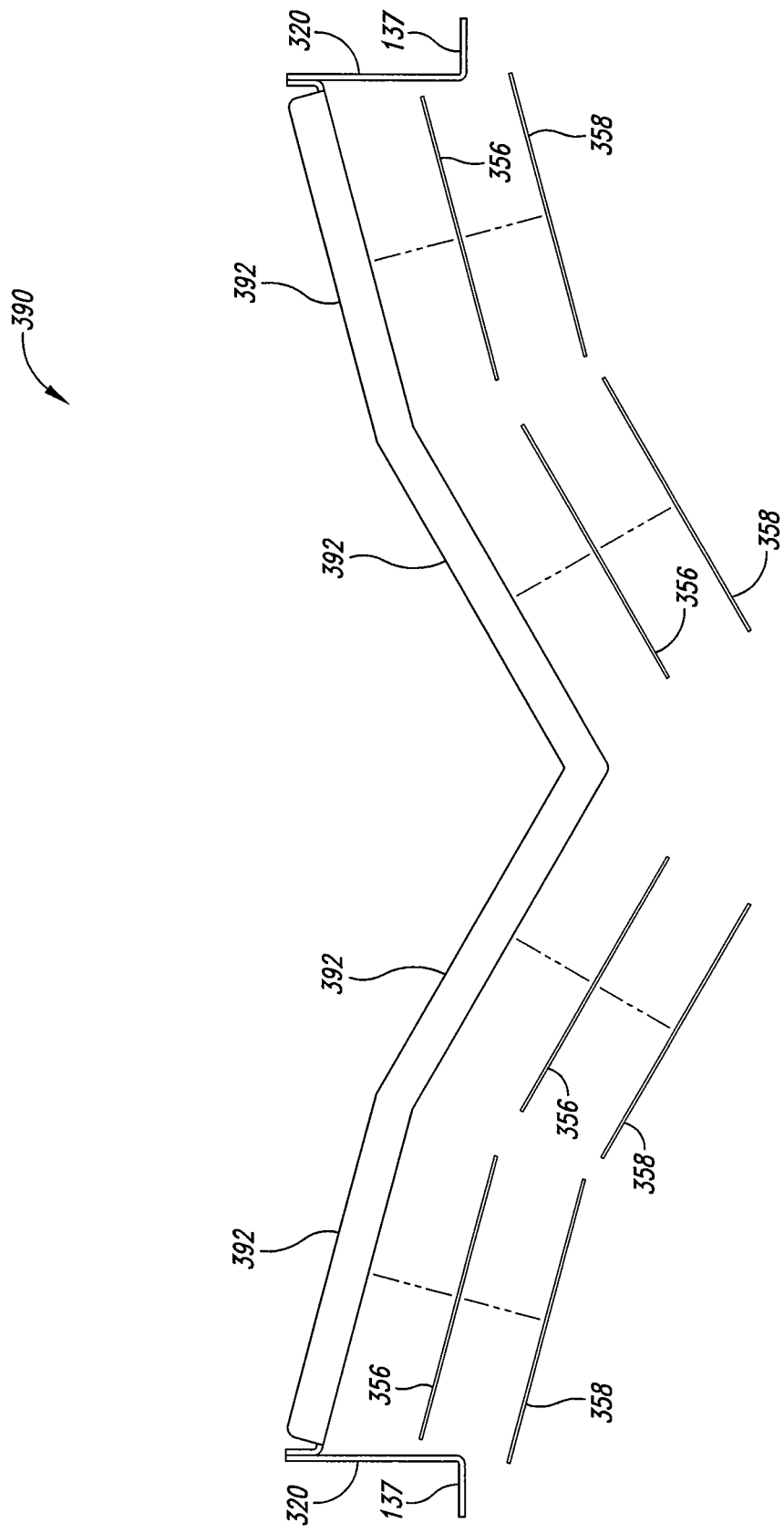
FIG. 32 is a top view of a twelfth combination of an eighth label implementation and a ninth multi-port station.

A twelfth combination of a multi-port station 390 and an eighth label implementation is shown in FIG. 32. The ninth multi-port station 390 has four angled sections 392 as in the sixth multi-port station 310 of FIG. 24, with each angled section receiving the label media 356 and the transparent cover 358.

Figure 33:
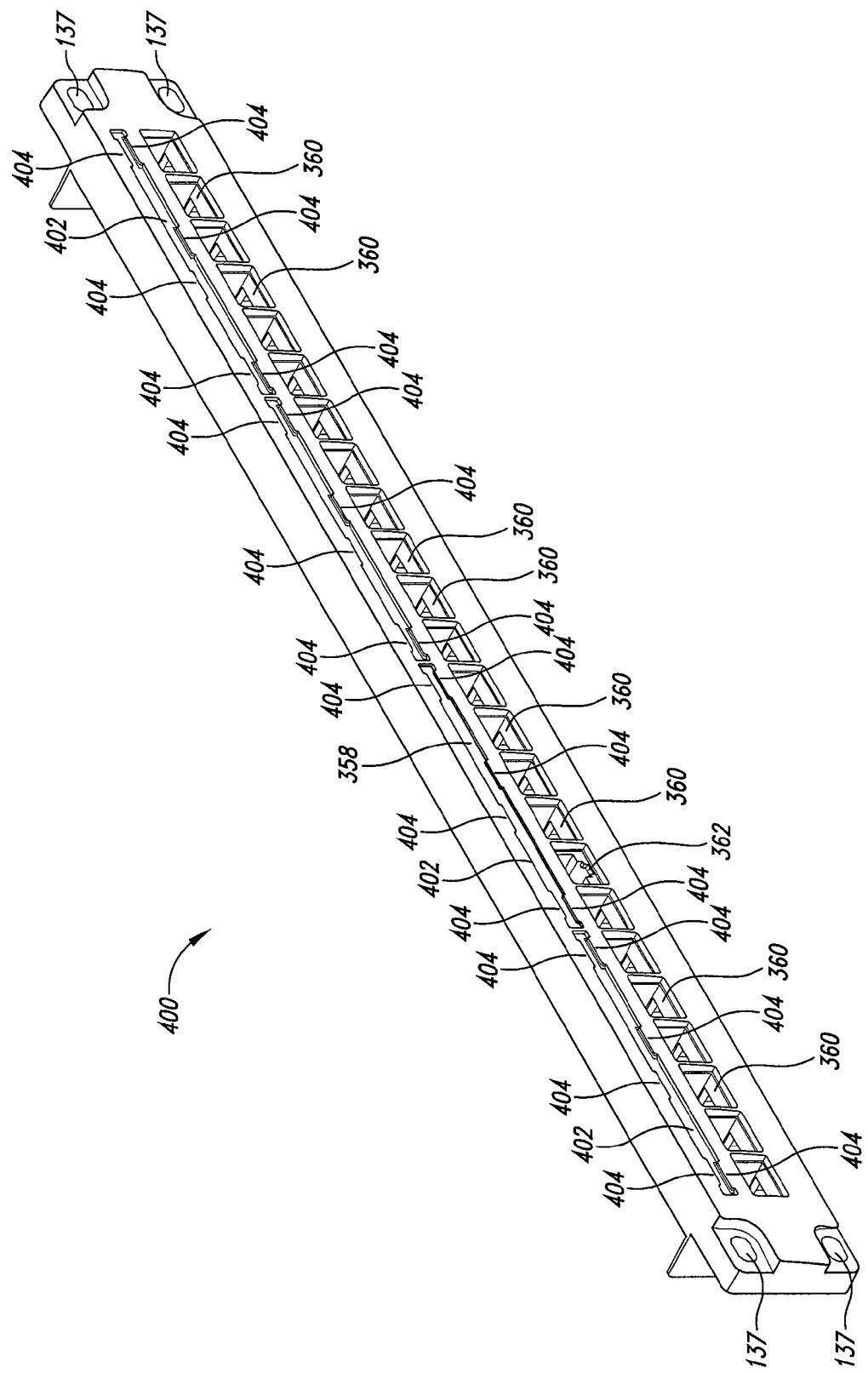
FIG. 33 is an isometric front view of a thirteenth combination of a ninth label implementation and a tenth multi-port station.

A thirteenth combination of a tenth multi-port station 400 and a ninth label implementation is shown in FIG. 33. The tenth multi-port station 400 has a single channel 402 with tabs 404 to retain and secure the label media 356 and the transparent covers 358. The single channel 402 is positioned above a single row of the ports 360.

Figure 34:
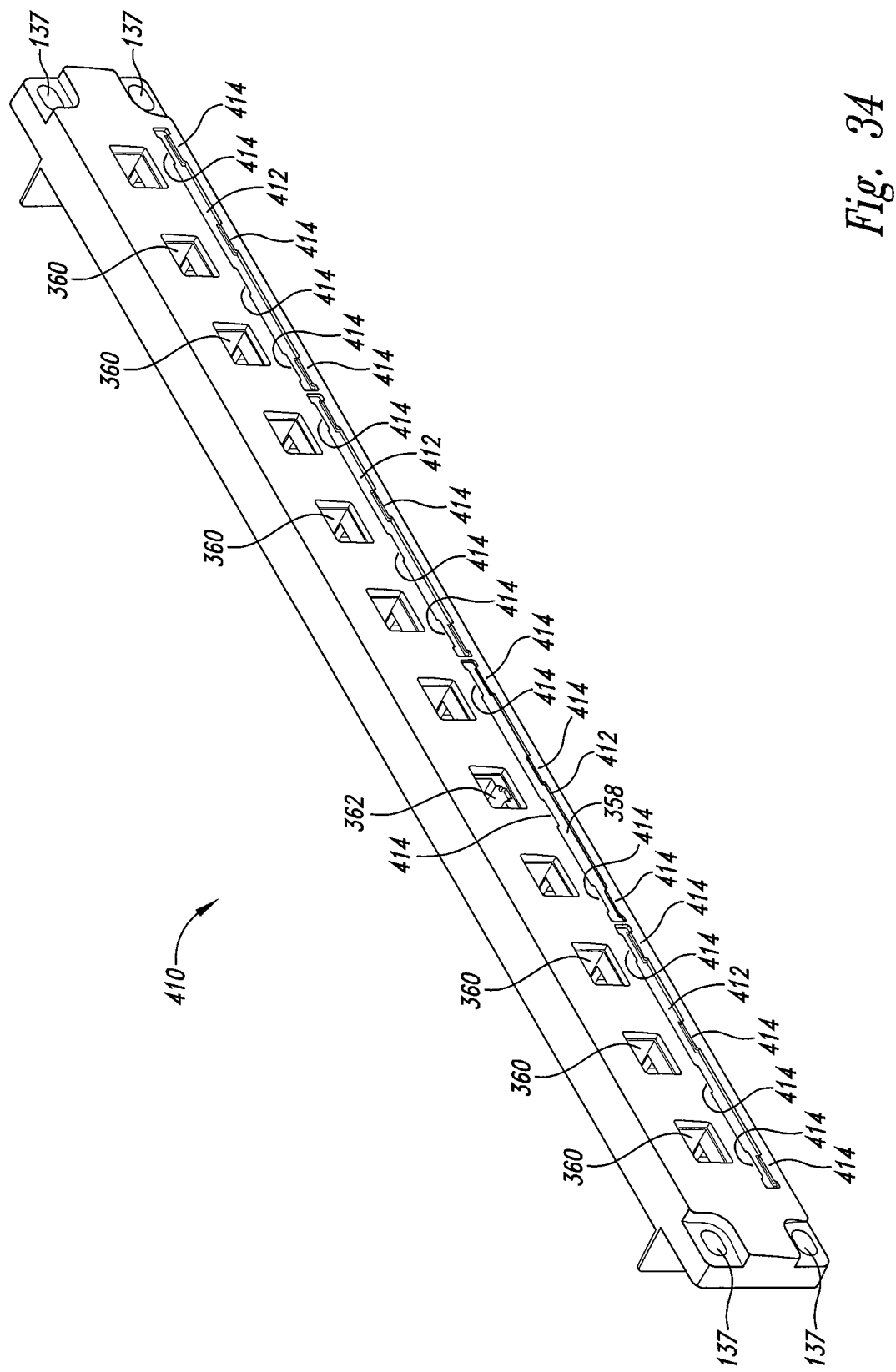
FIG. 34 is an isometric front view of a fourteenth combination of a tenth label implementation and an eleventh multi-port station.

A fourteenth combination of an eleventh multi-port station 410 and a tenth label implementation is shown in FIG. 34. The eleventh multi-port station 410 has a single channel 412 with tabs 414 to retain and secure the label media 356 and the transparent covers 358. The single channel 412 is positioned below a single row of the ports 360.

Figure 35:
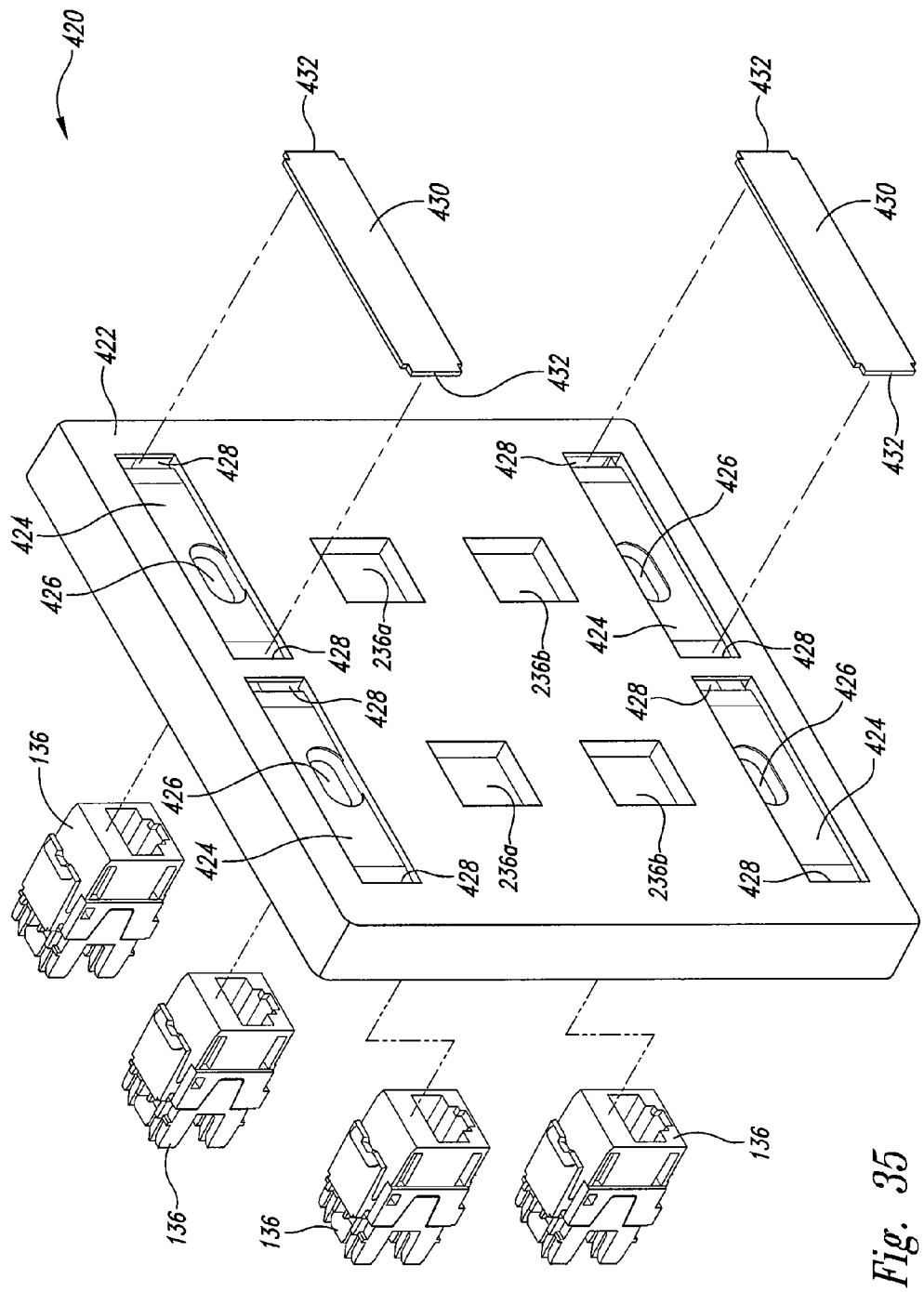
FIG. 35 is an exploded isometric front view of a fifteenth combination of an eleventh label implementation and a twelfth multi-port station.
Figure 36:
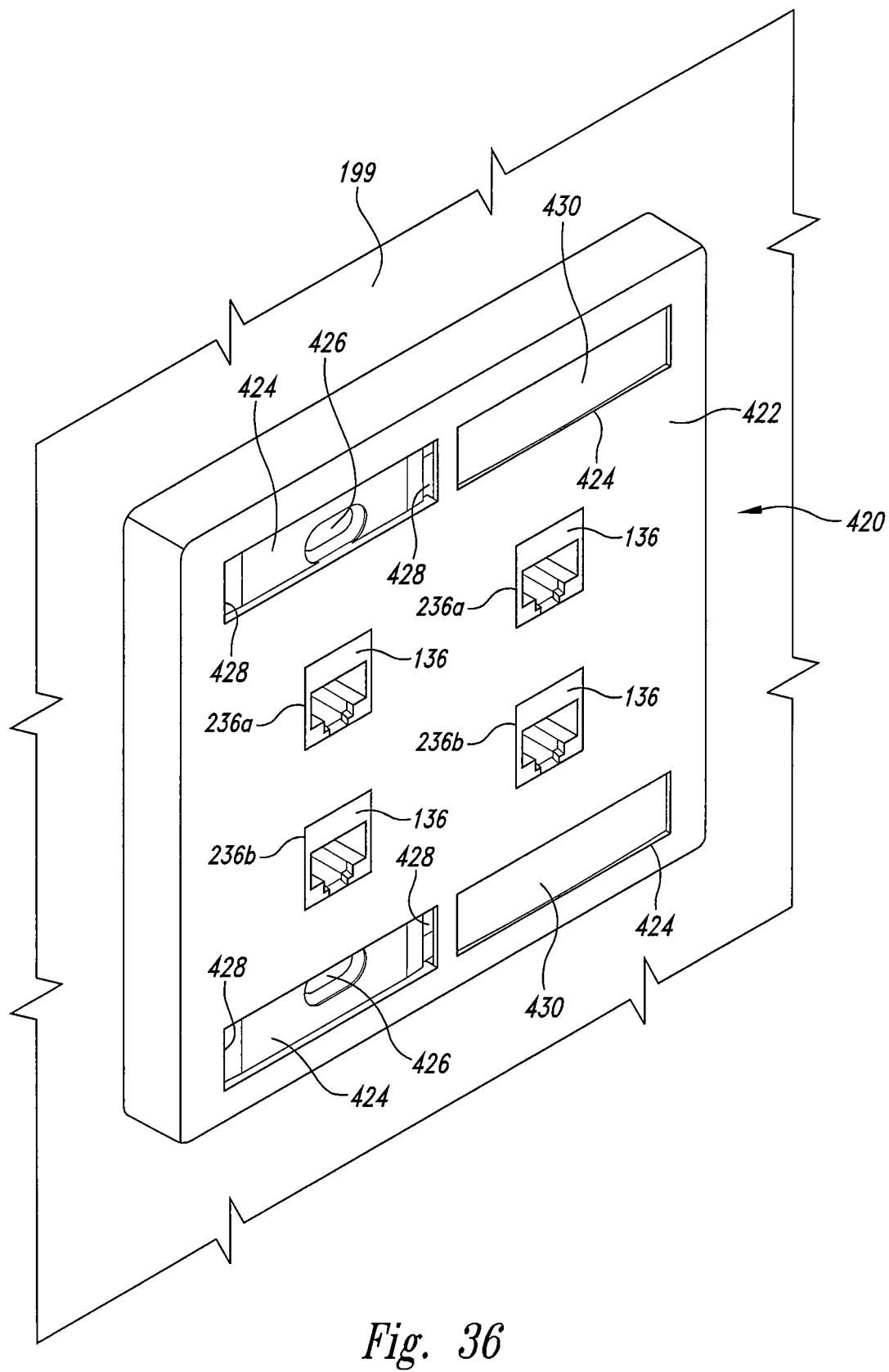
FIG. 36 is an isometric front view of the fifteenth combination of FIG. 35.

A fifteenth combination of a twelfth multi-port station 420 and an eleventh label implementation is shown in FIG. 35 and FIG. 36. The twelfth multi-port station 420 has a front wall plate 422 with elongated recesses 424 and openings 426. The recesses 424 include end-notches 428. The recesses 424 are shaped to receive label media 430 having end-tabs 432 that engage with the end-notches 428 of the recesses. In the implementation shown, two of the recesses 424 are positioned above the first horizontal row of two ports 236a and two of the recesses are positioned below the second horizontal row of two ports 236b.

Figure 37:
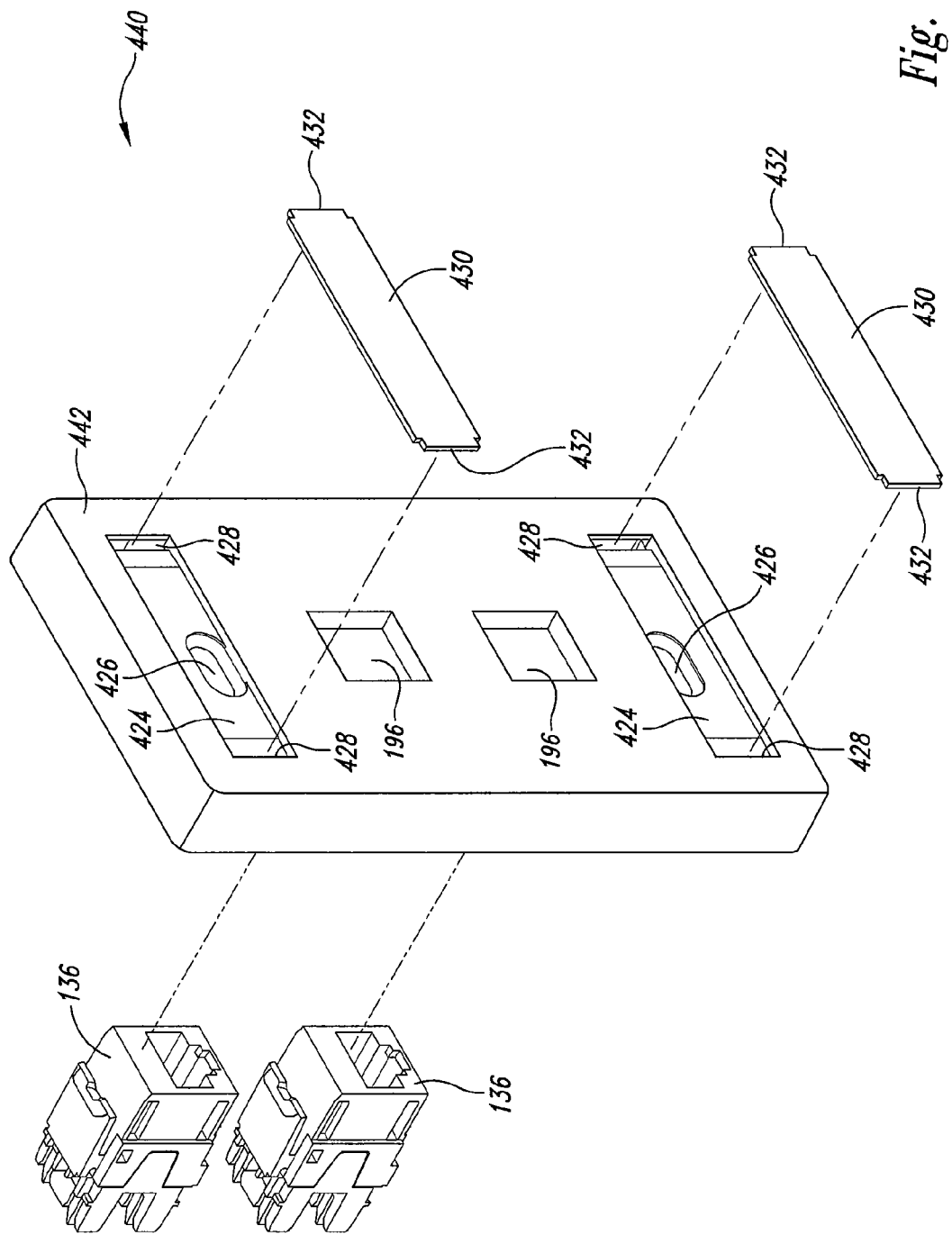
FIG. 37 is an exploded isometric front view of a sixteenth combination of a twelfth label implementation and a thirteenth multi-port station.
Figure 38:
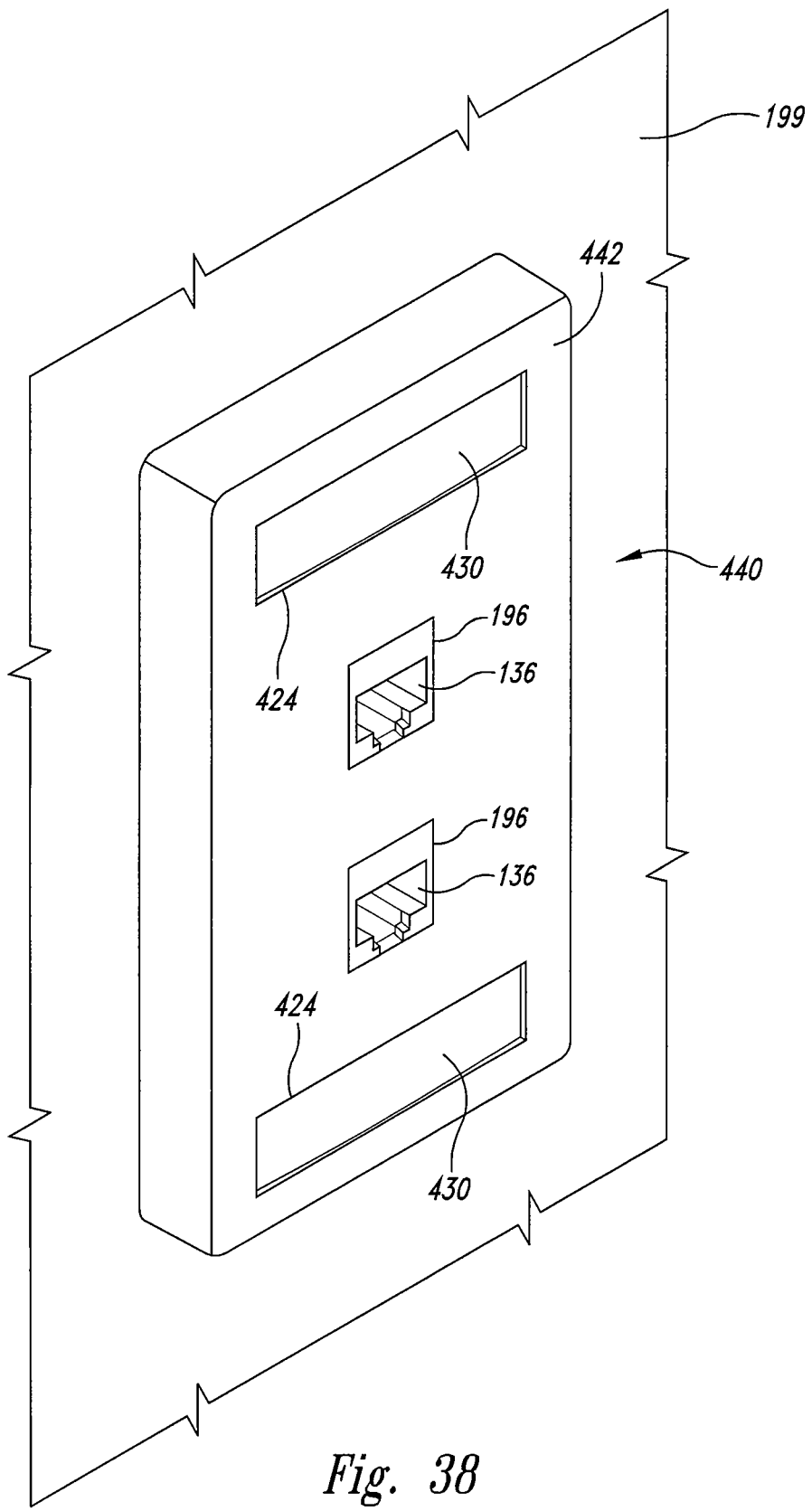
FIG. 38 is an isometric front view of the sixteenth combination of FIG. 37.

A sixteenth combination of a thirteenth multi-port station 440 and a twelfth label implementation is shown in FIG. 37 and FIG. 38. The thirteenth multi-port station 440 has only two of the ports 196 and two of the recesses 424, but is otherwise similar to the twelfth multi-port station 420 of FIGS. 35 and 36. For the thirteenth multi-port station 440, one of the two recesses 424 is positioned above the upper one of the ports 196 and the other of the two recesses 424 is positioned below the lower one of the ports.

Figure 39:
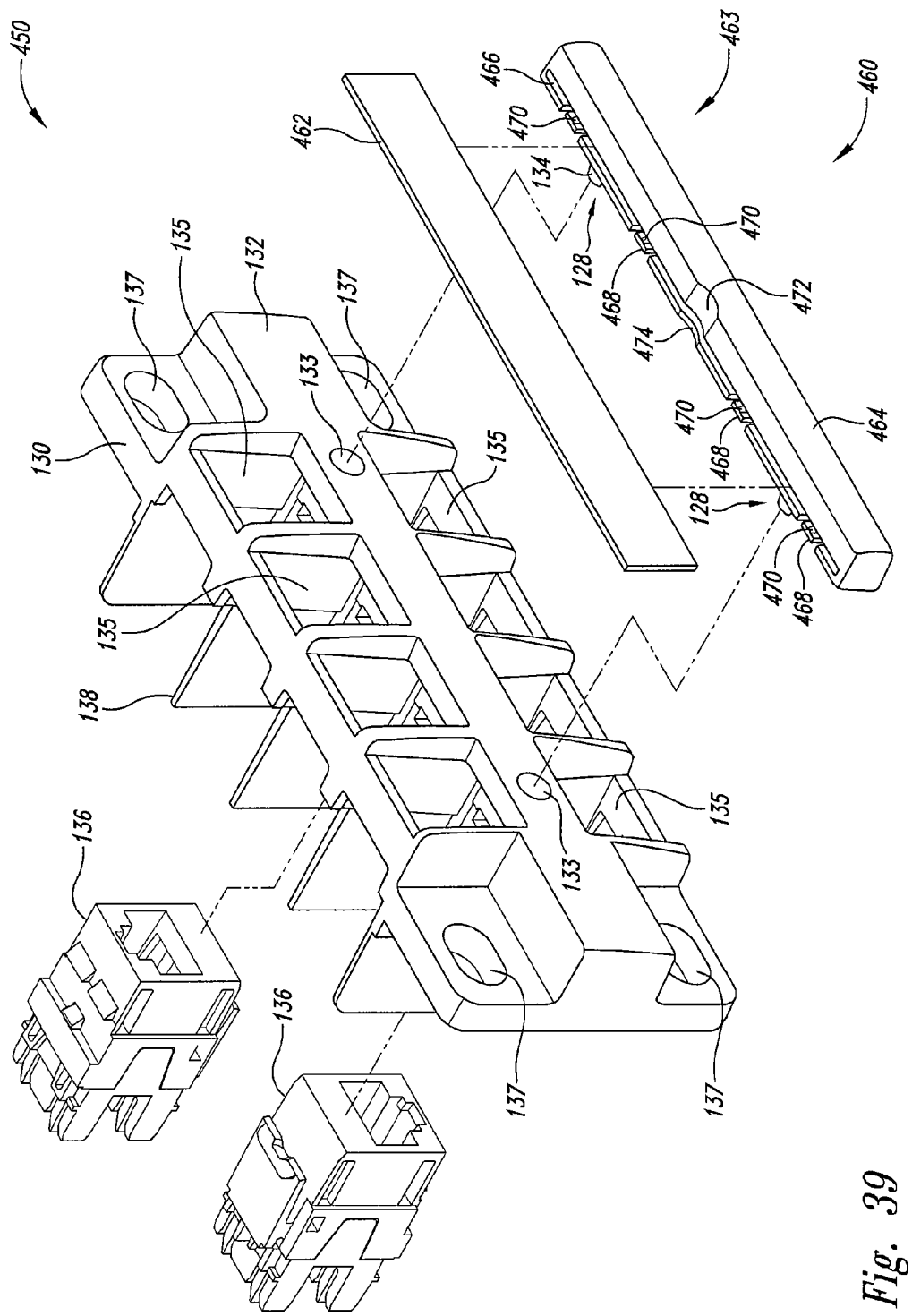
FIG. 39 is an exploded isometric front view of a seventeenth combination of a thirteenth label implementation and the first multi-port station of FIG. 1.
Figure 40:
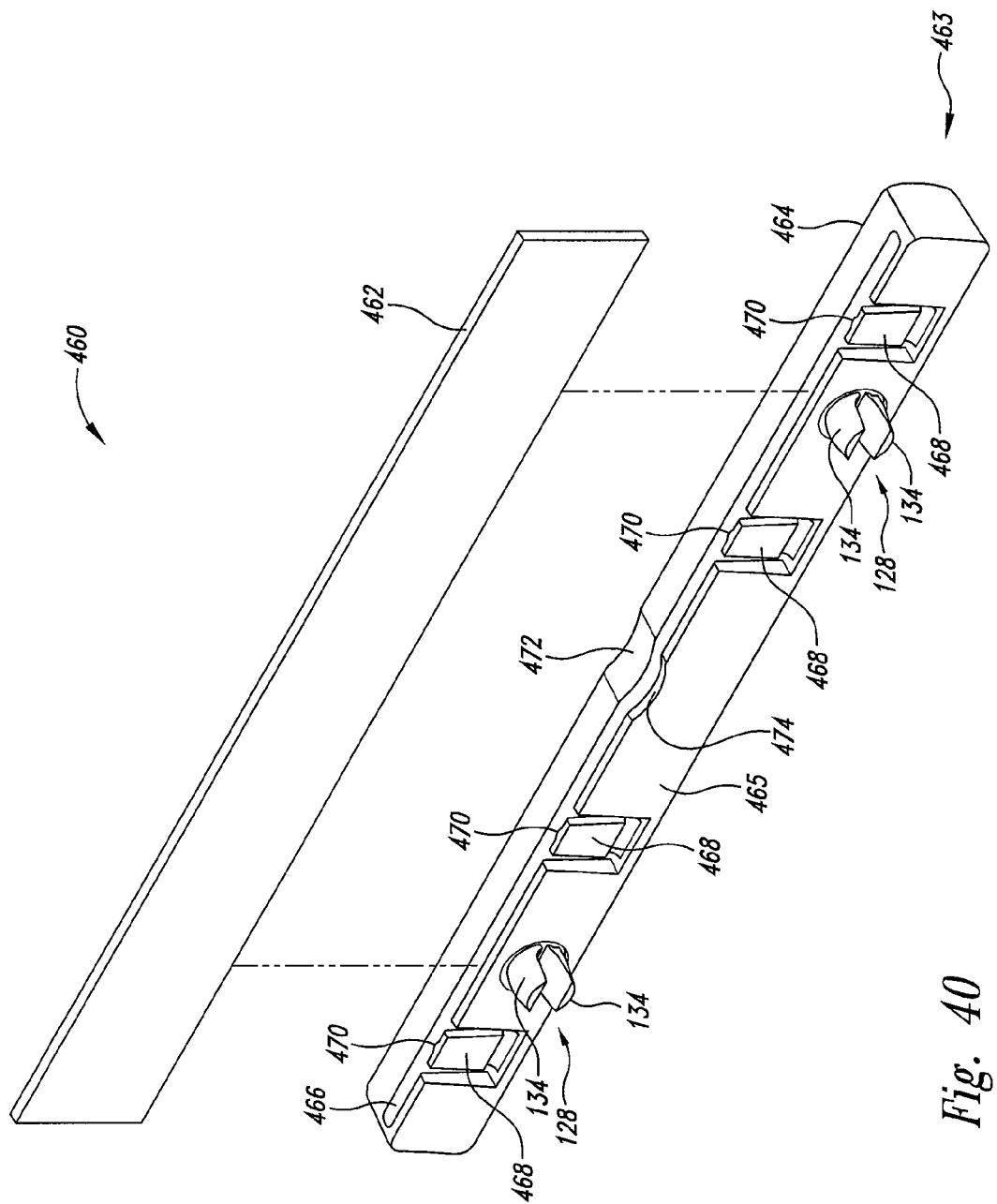
FIG. 40 is an exploded isometric rear view of the seventeenth label implementation of FIG. 39.
Figure 41:
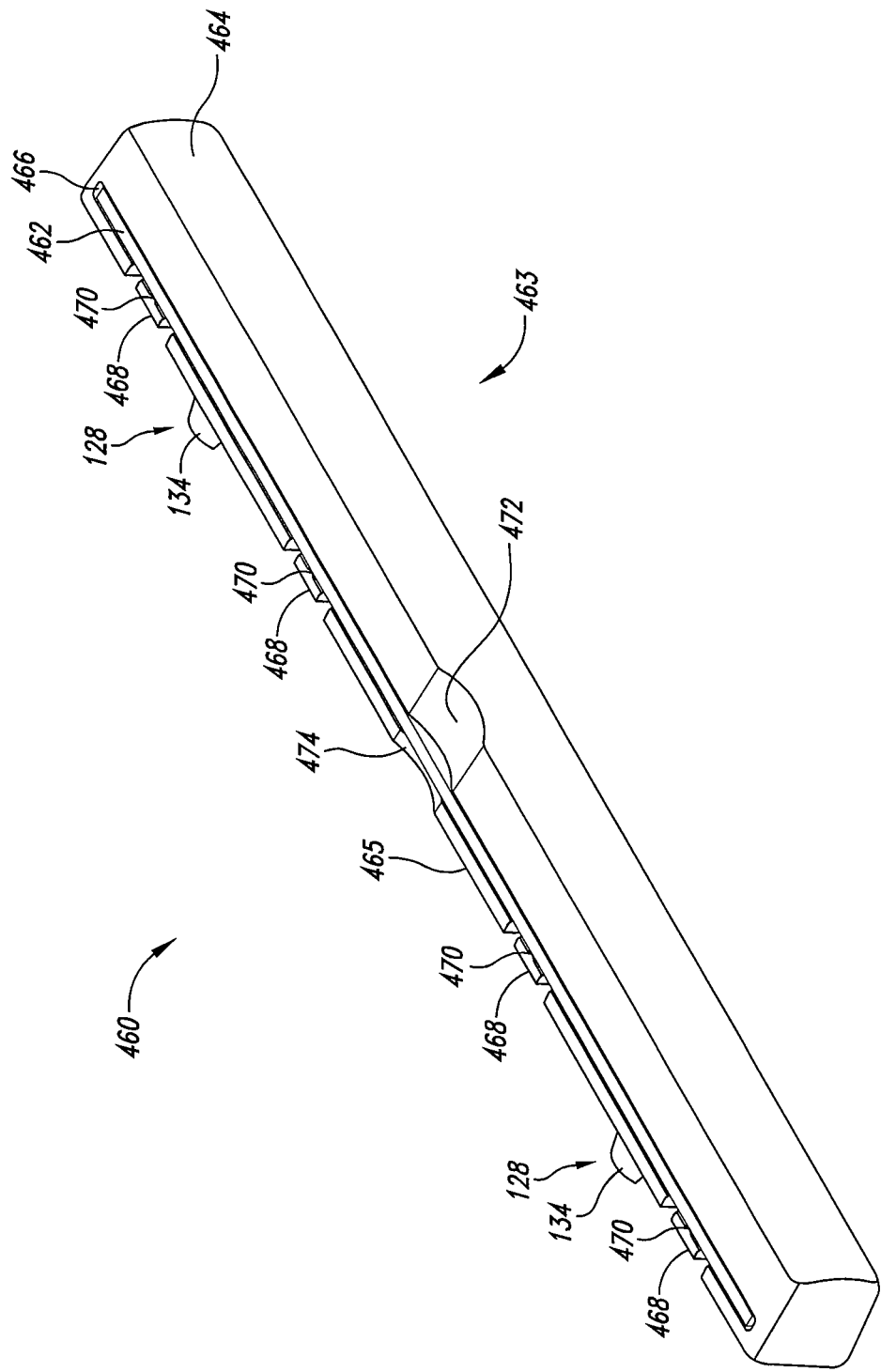
FIG. 41 is an isometric front view of the seventeenth label implementation of FIG. 39.
Figure 42:
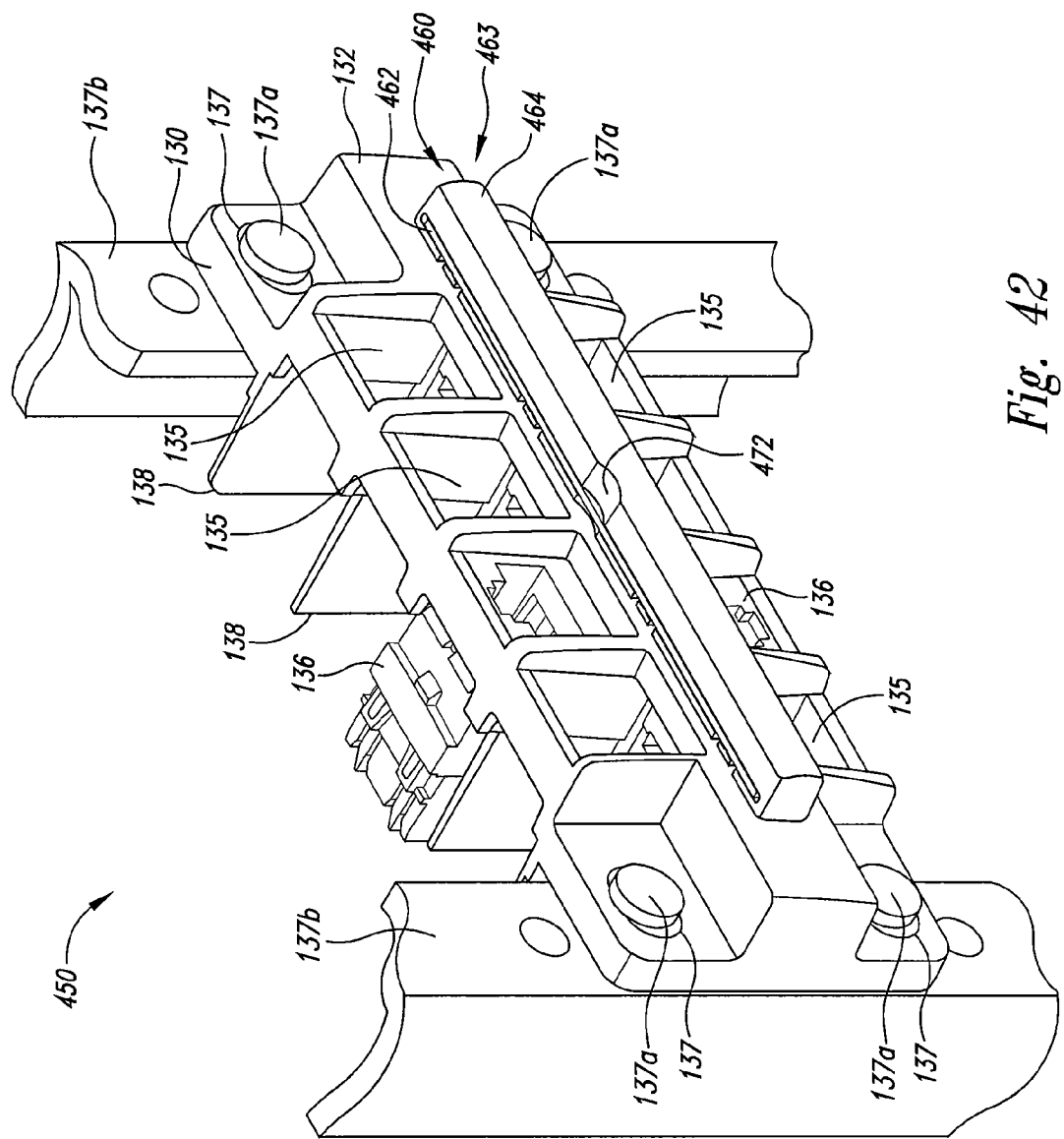
FIG. 42 is an isometric front view of the seventeenth combination of FIG. 39.

A seventeenth combination 450 of the first multi-port station 130 and a thirteenth label implementation 460 is shown in FIG. 39 and FIG. 42. The thirteenth label implementation 460 includes label media 462 and a holder 463, as further shown in FIG. 40 and FIG. 41, having a transparent cover portion 464, a rear portion 465, and a slot 466 therebetween. The label media 462 is received into the slot 466 of the holder 463. The holder 463 further includes tensioned members 468 with contact portions 470 that help to retain the label media 462 in the slot 466. A notch 472 in the cover portion 464 and a notch in the rear portion 465 provides additional access for removal of the label media 462 from the holder 463.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A cable port identification system for use with a label media and a multi-port station, the system comprising:
   a cover portion comprising a first end portion, a second end portion opposite the first end portion, and a slot extending between the first end portion and the second end portion, the slot being configured to receive the label media; and
   an anchor portion couplable to the multi-port station comprising a fastener, the cover portion being pivotably coupled to the anchor portion by its first end portion and positioned to be selectively pivoted between a closed position and an open position relative to the anchor portion, the second end portion of the cover portion being engagable by the fastener when the cover portion is in the closed position, the second end portion of the cover portion being disengaged and spaced from the fastener when the cover portion is in the open position, and the cover portion being positionable in the open position when the anchor portion is coupled to the muli-port station.

2. The cable port identification system of claim 1, wherein the anchor portion comprises an outwardly facing surface, and
   when the cover portion is in the closed position, the cover portion is in juxtaposition with the outwardly facing surface of the anchor portion, and the slot is adjacent the outwardly facing surface of the anchor portion such that the label media is received in the slot and sandwiched between the cover portion and the outwardly facing surface.

3. The cable port identification system of claim 1, wherein the slot has an opening at the second end portion, and the opening is configured to slidably receive the label media.

4. The cable port identification system of claim 3, wherein when the cover portion is in the closed position, the fastener is adjacent the opening and positioned to prevent the label media from entering or exiting the opening of the slot.

5. The cable port identification system of claim 1, wherein the anchor portion comprises a spring portion,
   the fastener is attached to the spring portion, and
   the spring portion is configured to bias the fastener into engagement with the second end portion of the cover portion when the cover portion is in the closed position.

6. The cable port identification system of claim 1, wherein the anchor portion comprises a spring portion,
   the fastener is mounted on the spring portion,
   when the cover portion is in the closed position, the spring portion exerts a biasing force on the fastener that biases the fastener into engagement with the second end portion of the cover portion,
   the fastener is configured to receive a sufficient displacement force to overcome the biasing force exerted by spring portion and move the fastener out of engagement with the second end portion of the cover portion, and
   when the fastener is disengaged from the second end portion, the cover portion is pivotable about the first end portion relative to the anchor portion.

7. The cable port identification system of claim 1, wherein the anchor portion comprises a spring portion,
   the fastener is mounted on the spring portion and includes a latch portion,
   the second end portion of the cover portion comprises a notch configured to receive at least the latch portion of the fastener, and
   when the cover portion is in the closed position, the spring portion biases the latch portion of the fastener into the notch of the second end portion of the cover portion for releasably latching together the cover portion and the anchor portion.

8. The cable port identification system of claim 1, wherein the second end portion of the cover portion comprises a notch configured to be engaged by the fastener when the cover portion is in the closed position and when so engaged, to maintain the cover portion in the closed position.

9. The cable port identification system of claim 1, further comprising:
   a hinge pivotably coupling the first end portion of the cover portion to the anchor portion.

10. The cable port identification system of claim 9, wherein the hinge is a single-piece hinge.

11. The cable port identification system of claim 10, wherein the single-piece hinge comprises a hinge material integrated with material of the cover portion and material of the anchor portion.

12. The cable port identification system of claim 1, wherein the slot of the cover portion comprises a bottom portion,
   the cover portion comprises a plurality of tabs that extend laterally inwardly into the slot,
   the tabs are spaced apart from the bottom portion of the slot to provide adequate space to receive the label media between the bottom portion and the plurality of tabs, and
   the tabs are configured to maintain the label media within the slot.

13. The cable port identification system of claim 12, wherein the anchor portion comprises a notch corresponding to each of the plurality of tabs, each notch being configured to receive at least a portion of the tab that corresponds to the notch when the cover portion is in the closed position.

14. The cable port identification system of claim 1 for use with a multi-port station comprising a plurality of holes, wherein the anchor portion comprises a peg corresponding to each of the plurality of holes,
   the pegs are insertable inside the plurality of holes of the multi-port station, and
   each of the pegs comprises split portions configured to maintain the peg inside the corresponding hole of the multi-port station.

15. The cable port identification system of claim 1 wherein the cover portion includes a lens for viewing of the label media therethrough when in the slot when the cover portion is in the closed position.

16. A port identification system comprising:
   a multi-port station;
   a label media;
   a backing configured to engage with the multi-port station; and
   a cover hingedly coupled to the backing to pivot between an open position and a closed position relative to the backing, the label media being positioned between the cover and the backing when the cover is in the closed position and the label media being removable from between the backing and the cover when the cover is in the open position, the cover being positionable in the open position when the backing is engaged with the multi-port station.

17. The port identification system of claim 16, wherein the multi-port station comprises a first row of ports and a second row of ports, and the backing is configured to engage with the multi-port station to position the backing adjacent to at least one of the first row of ports and the second row of ports.

18. The port identification system of claim 17, wherein the backing is configured to engage with the multi-port station to position the backing between the first row and the second row of ports.

19. The port identification system of claim 17, wherein the backing is configured to engage with the multi-port station to position the backing above the first row of ports.

20. The port identification system of claim 17, wherein the backing is configured to engage with the multi-port station to position the backing below the second row of ports.

21. The port identification system of claim 16, wherein the multi-port station comprises a first row of ports, and the backing is configured to engage with the multi-port station to position the backing adjacent to the first row of ports.

22. The cable port identification system of claim 16, wherein the backing comprises a fastener configured to engage the cover when the cover is in the closed position and to be selectively disengagable from the cover to allow the cover to be pivoted from the closed position into the open position.

23. The cable port identification system of claim 22, wherein the fastener comprises a leaf spring and a push-tab portion, the leaf spring biasing the push-tab portion into engagement with the cover when the cover is in the closed position, the push-tab portion being manually movable out of engagement with the cover to allow the cover to be pivoted manually from the closed position into the open position.

24. The cable port identification system of claim 23, wherein the cover comprises a notch sized to receive and releasably retain at least a portion of the push-tab portion of the fastener when the cover is in the closed position.

25. The cable port identification system of claim 16, wherein the cover comprises an elongated transparent lens having a rearward facing surface that faces the backing when the cover is in the closed position, and a recess formed in the rearward facing surface sized to receive the label media.

26. The cable port identification system of claim 16, further comprising a single-piece hinge wherein the cover is hingedly coupled to the backing by the single-piece hinge.

27. The cable port identification system of claim 26, wherein the single-piece hinge comprises a hinge material integrated with material of the cover and material of the backing.

28. The cable port identification system of claim 16, wherein the multi-port station is configured for engagement with a rack.

29. A cable port identification system for use with a multiport system, and a label media having information displayed thereupon, the cable port identification system comprising:
a base portion having a rear facing base portion couplable to the multi-port system, and a front facing base portion opposite the rear facing base portion, and a lens portion having a front facing lens portion and a rear facing lens portion with a slot formed therein, the rear facing lens portion configured to receive the label media with the information thereupon facing forward, the front facing lens portion being configured to magnify at least a portion of the forward facing information on the label media to produce a magnified visual presentation of the portion of the information on the label media viewable from forward of the lens portion, the lens portion being pivotably coupled to the base portion to move between an open position to receive the label media into the slot and a closed position to position the label media between the front facing base portion and the rear facing lens portion, the lens portion being positionable in the open position when the rear facing base portion of the base portion is coupled to the multi-port system.

30. The cable port identification system of claim 29, wherein the base portion comprises a fastener configured to engage the lens portion when the lens portion is in the closed position and to be selectively disengagable from the lens portion to allow the lens portion to be pivotally moved into the open position.

31. The cable port identification system of claim 30, wherein the fastener comprises a leaf spring and a push-tab portion, the leaf spring biasing the push-tab portion into engagement with the lens portion when the lens portion is in the closed position, the push-tab portion being manually movable out of engagement with the lens portion to allow the lens portion to be pivotally moved into the open position.

32. The cable port identification system of claim 31, wherein the lens portion comprises a notch sized to receive and retain at least a portion of the push-tab portion of the fastener when the lens portion is in the closed position.

33. The cable port identification system of claim 29, further comprising a single-piece hinge wherein the lens portion is pivotably coupled to the base portion by the single-piece hinge.

34. The cable port identification system of claim 33, wherein the single-piece hinge comprises a hinge material integrated with material of the lens portion and material of the base portion.

35. The cable port identification system of claim 1, further comprising:
a hinge pivotably coupling the first end portion of the cover portion to the anchor portion, wherein the label media is positionable between the cover portion and the anchor portion when the cover portion is in the closed position and the label media is removable from between the anchor portion and the cover portion when the cover portion is in the open position.

* * * * *